United States Patent
Tezuka et al.

(10) Patent No.: US 9,744,443 B2
(45) Date of Patent: Aug. 29, 2017

(54) SERVER, TERMINAL, NETWORK SYSTEM, PROGRAM AND INFORMATION STORAGE MEDIUM

(75) Inventors: Koji Tezuka, Tokyo (JP); Masaki Ota, Tokyo (JP); Kentaro Honma, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 616 days.

(21) Appl. No.: 14/110,608

(22) PCT Filed: Apr. 11, 2012

(86) PCT No.: PCT/JP2012/059852
§ 371 (c)(1),
(2), (4) Date: Dec. 9, 2013

(87) PCT Pub. No.: WO2012/141188
PCT Pub. Date: Oct. 18, 2012

(65) Prior Publication Data
US 2014/0113728 A1    Apr. 24, 2014

(30) Foreign Application Priority Data
Apr. 11, 2012  (JP) ................................ 2011-088686

(51) Int. Cl.
*A63F 9/24* (2006.01)
*A63F 13/30* (2014.01)
*G07F 17/32* (2006.01)

(52) U.S. Cl.
CPC .......... *A63F 13/12* (2013.01); *G07F 17/3237* (2013.01); *A63F 2300/201* (2013.01); *A63F 2300/5586* (2013.01)

(58) Field of Classification Search
CPC ............ A63F 2300/40; A63F 2300/401; A63F 2300/402; A63F 2300/404; A63F 2300/406; A63F 13/00; A63F 9/24
See application file for complete search history.

(56) References Cited

U.S. PATENT DOCUMENTS 6,801,930 B1 * 10/2004 Dionne ................... H04L 41/00
                                                                    463/32
7,314,407 B1    1/2008 Pearson
(Continued)

FOREIGN PATENT DOCUMENTS

| JP | A 2002-136766 | 5/2002 |
| JP | A 2007-61339 | 3/2007 |

(Continued)

OTHER PUBLICATIONS

Jul. 17, 2012 Search Report issued in International Patent Application No. PCT/JP2012/059852 (with translation).

*Primary Examiner* — Kang Hu
*Assistant Examiner* — Jeffrey Wong
(74) *Attorney, Agent, or Firm* — Oliff PLC

(57) ABSTRACT

A server is connected to a terminal via a network, and manages registration of game information, the terminal performing a first game process that utilizes stored game information, and a second game process that utilizes registered game information. The server stores terminal identification information of the terminal and an allowable registration count of the terminal in a linked manner, updates the allowable registration count while being linked to the terminal identification information corresponding to a received update allowable registration count, transmits a registration permission notification to the terminal upon reception of a game information registration request from the terminal when the allowable registration count is equal to or larger than a given number, transmits a registration non-permission (Continued)

notification to the terminal when the allowable registration count is less than the given number, and decrements the allowable registration count when the server has transmitted the registration permission notification to the terminal.

13 Claims, 18 Drawing Sheets

(56) References Cited

U.S. PATENT DOCUMENTS

| | | |
|---|---|---|
| 8,088,008 B2 | 1/2012 | Inubushi et al. |
| 2009/0062009 A1* | 3/2009 | Inubushi ............... A63F 13/10 463/42 |
| 2010/0261519 A1* | 10/2010 | Zapata .................. A63F 1/04 463/22 |

FOREIGN PATENT DOCUMENTS

| | | |
|---|---|---|
| JP | B1 4642933 | 3/2011 |
| WO | WO 2006/123477 A1 | 11/2006 |

* cited by examiner

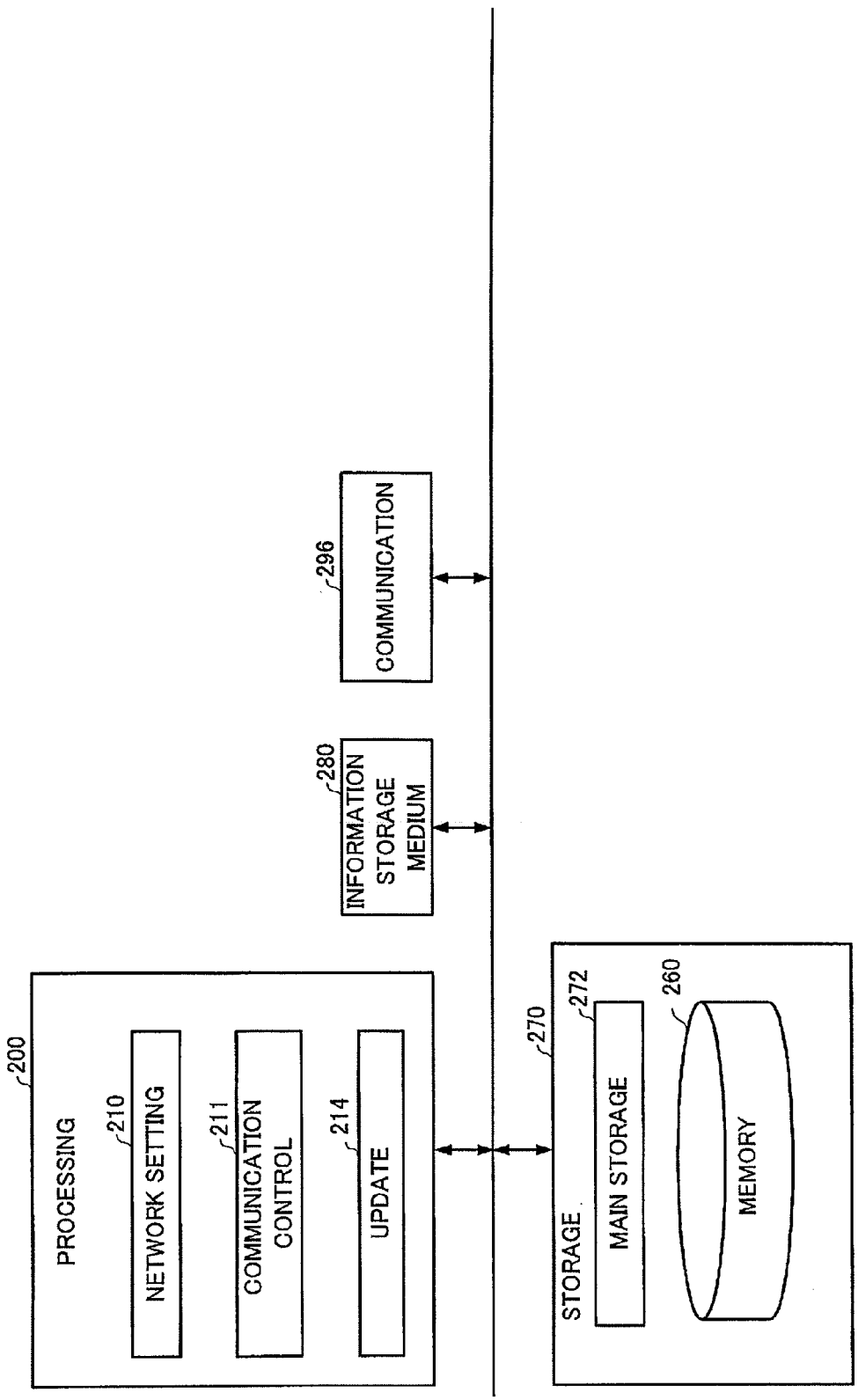

FIG.7

| TERMINAL IDENTIFICATION INFORMATION | REGISTRATION LIMIT COUNT |
|---|---|
| 1 | 3 |
| 2 | 6 |
| 3 | 0 |
| ⋮ | ⋮ |

FIG.8

| SERIAL INFORMATION | FLAG |
|---|---|
| ABC1234 | 1 |
| CBD9878 | 0 |
| FGE5435 | 0 |
| ⋮ | ⋮ |

FIG.9

| REGISTRATION LIMIT COUNT P | 3 |
|---|---|
| REGISTRATION COUNT Q | 2 |
| ALLOWABLE REGISTRATION COUNT R | 1 |

| ID | GAME INFORMATION |
|---|---|
| 1 | GAME INFORMATION A |
| 2 | GAME INFORMATION B |
| 3 | NULL |

FIG.15
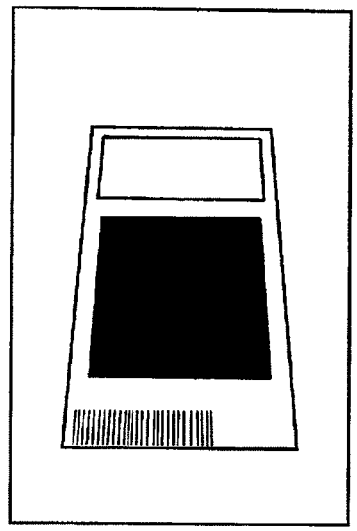
CAPTURED IMAGE
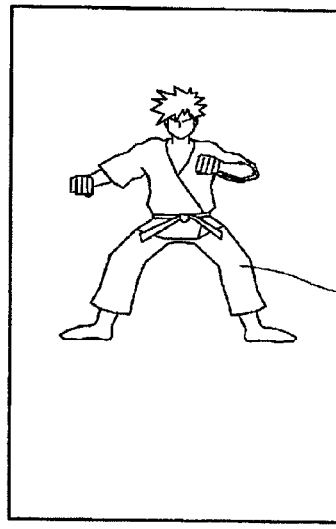
VIRTUAL IMAGE
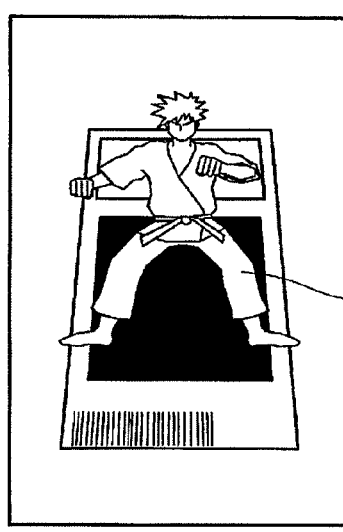
AUGMENTED
REALITY IMAGE

SERVER, TERMINAL, NETWORK SYSTEM, PROGRAM AND INFORMATION STORAGE MEDIUM

TECHNICAL FIELD

The present invention relates to a program, an information storage medium, a server, a terminal, and a network system.

BACKGROUND ART

A game device has been known that is configured so that the player purchases a game card, and plays the game using the purchased card (see JP-A-2007-061339).

SUMMARY OF THE INVENTION

Technical Problem

The operator of such a card game earns profits by selling game information (e.g., a card that records game information).

However, a known game device may be configured to perform the game process without selecting game information obtained by reading a code (e.g., barcode or two-dimensional code) recorded on the card, for example. Therefore, a situation may occur in which the user illegally acquires the game information (e.g., a card that records game information) without purchasing a card (e.g., by borrowing a card from another person), and the operator may lose profits.

The invention was conceived in view of the above situation. Several aspects of the invention may provide a server, a terminal, a network system, a program, and an information storage medium that can prevent a situation in which game information is illegally acquired.

Solution to Problem (1) According to a first aspect of the invention, there is provided a server that is connected to a terminal via a network, and manages registration of game information, the terminal performing a first game process that utilizes stored game information, and a second game process that utilizes registered game information among the stored game information, the server including:

a storage section that stores terminal identification information of the terminal and an allowable registration count of the game information for the terminal in a linked manner;

a communication control section that receives data that specifies an update allowable registration count and the terminal identification information of the terminal, the update allowable registration count being linked to a number of pieces of game information acquired through the terminal; and an update section that updates the allowable registration count that is stored while being linked to the terminal identification information corresponding to the received data that specifies the update allowable registration count, the communication control section transmitting a registration permission notification to the terminal upon reception of a game information registration request from the terminal when the allowable registration count corresponding to the terminal identification information of the terminal is equal to or larger than a given number, and transmitting a registration non-permission notification to the terminal upon reception of the game information registration request from the terminal when the allowable registration count corresponding to the terminal identification information of the terminal is less than the given number, and the update section decrementing the allowable registration count when the communication control section has transmitted the registration permission notification to the terminal.

The data that specifies the update allowable registration count may be the update allowable registration count that indicates the same number as the number of pieces of game information acquired through the terminal.

The data that specifies the update allowable registration count may be serial information acquired together with the game information acquired through the terminal, and the update section may determine whether or not the received serial information is valid, and may update the allowable registration count corresponding to the terminal identification information based on the update allowable registration count corresponding to the serial information when the received serial information is valid.

The communication control section may transmit the registration permission notification to the terminal upon reception of a specific game information registration request from the terminal regardless of whether or not the allowable registration count corresponding to the terminal identification information of the terminal is equal to or larger than the given number, and the update section may not decrement the allowable registration count when the communication control section has transmitted the registration permission notification to the terminal.

The update section may not decrement the allowable registration count corresponding to the terminal identification information of the terminal upon reception of the game information registration request from the terminal when the game information of the game information registration request has been registered.

A network system may be configured to include the server and the terminal, the server and the terminal exchanging data via a network.

(2) According to a second aspect of the invention, there is provided a terminal that performs a game process, the terminal including:

a storage section that stores an allowable registration count of game information;

an acquisition section that acquires the game information and an update allowable registration count that indicates a same number as a number of pieces of the acquired game information;

a first game processing section that performs a first game process based on the acquired game information;

a registration section that registers the game information under a given condition upon reception of a game information registration request;

a second game processing section that performs a second game process based on the registered game information; and an update section that updates the allowable registration count corresponding to the acquired update allowable registration count, the registration section registering the game information when the allowable registration count is equal to or larger than a given number, and not registering the game information when the allowable registration count is less than the given number, and the update section decrementing the allowable registration count when the game information has been registered.

(3) According to a third aspect of the invention, there is provided a terminal that performs a game process, the terminal including:

a storage section that stores an allowable registration count of game information;

an acquisition section that acquires the game information and serial information;

a first game processing section that performs a first game process based on the acquired game information;

a registration section that registers the game information under a given condition upon reception of a game information registration request;

a second game processing section that performs a second game process based on the registered game information; and an update section that updates the allowable registration count based on the update allowable registration count corresponding to the serial information when the acquired serial information is valid, the registration section registering the game information when the allowable registration count is equal to or larger than a given number, and not registering the game information when the allowable registration count is less than the given number, and the update section decrementing the allowable registration count when the game information has been registered.

(4) According to a fourth aspect of the invention, there is provided a network system including a server and a terminal, the server and the terminal exchanging data via a network, the terminal including:

a storage section that stores an allowable registration count of game information;

an acquisition section that acquires the game information and serial information;

a first game processing section that performs a first game process based on the acquired game information;

a registration section that registers the game information under a given condition upon reception of a game information registration request;

a second game processing section that performs a second game process based on the registered game information;

a communication control section that transmits terminal identification information of the terminal and the serial information to the server; and an update section that updates the allowable registration count of the game information, the server including:

a storage section that stores a registration limit count of the game information so that the registration limit count is linked to the terminal identification information of the terminal;

a communication control section that receives the terminal identification information of the terminal and the serial information from the terminal; and an update section that determines whether or not the received serial information is valid, and updates the registration limit count corresponding to the terminal identification information based on an update allowable registration count corresponding to the serial information when the received serial information is valid, the communication control section of the server transmitting the registration limit count corresponding to the terminal identification information of the terminal to the terminal in response to a request from the terminal, the communication control section of the terminal receiving the registration limit count from the server, the update section of the terminal updating the allowable registration count based on the registration limit count upon reception of the registration limit count from the server, the registration section of the terminal registering the game information when the allowable registration count is equal to or larger than a given number, and not registering the game information when the allowable registration count is less than the given number, and the update section of the terminal decrementing the allowable registration count when the game information has been registered in the terminal.

(5) According to a fifth aspect of the invention, there is provided a program that causes a server that is connected to a terminal via a network to manage registration of game information, the terminal performing a first game process that utilizes stored game information, and a second game process that utilizes registered game information among the stored game information, the program causing a computer to function as:

a storage section that stores terminal identification information of the terminal and an allowable registration count of the game information for the terminal in a linked manner;

a communication control section that receives data that specifies an update allowable registration count and the terminal identification information of the terminal, the update allowable registration count being linked to a number of pieces of game information acquired through the terminal; and an update section that updates the allowable registration count that is stored while being linked to the terminal identification information corresponding to the received data that specifies the update allowable registration count, the communication control section transmitting a registration permission notification to the terminal upon reception of a game information registration request from the terminal when the allowable registration count corresponding to the terminal identification information of the terminal is equal to or larger than a given number, and transmitting a registration non-permission notification to the terminal upon reception of the game information registration request from the terminal when the allowable registration count corresponding to the terminal identification information of the terminal is less than the given number, and the update section decrementing the allowable registration count when the communication control section has transmitted the registration permission notification to the terminal.

The program may be stored in a non-transitory computer-readable information storage medium.

BRIEF DESCRIPTION OF DRAWINGS

FIG. 3 is a functional block diagram of a server according to one embodiment of the invention.

FIG. 7 is a view illustrating a registration limit count according to one embodiment of the invention.

FIG. 8 is a view illustrating serial information according to one embodiment of the invention.

FIG. 9 is a view illustrating a registration limit count, a registration count, and an allowable registration count according to one embodiment of the invention.

FIG. 15 is a view illustrating an augmented reality image according to one embodiment of the invention.

Figure 1:
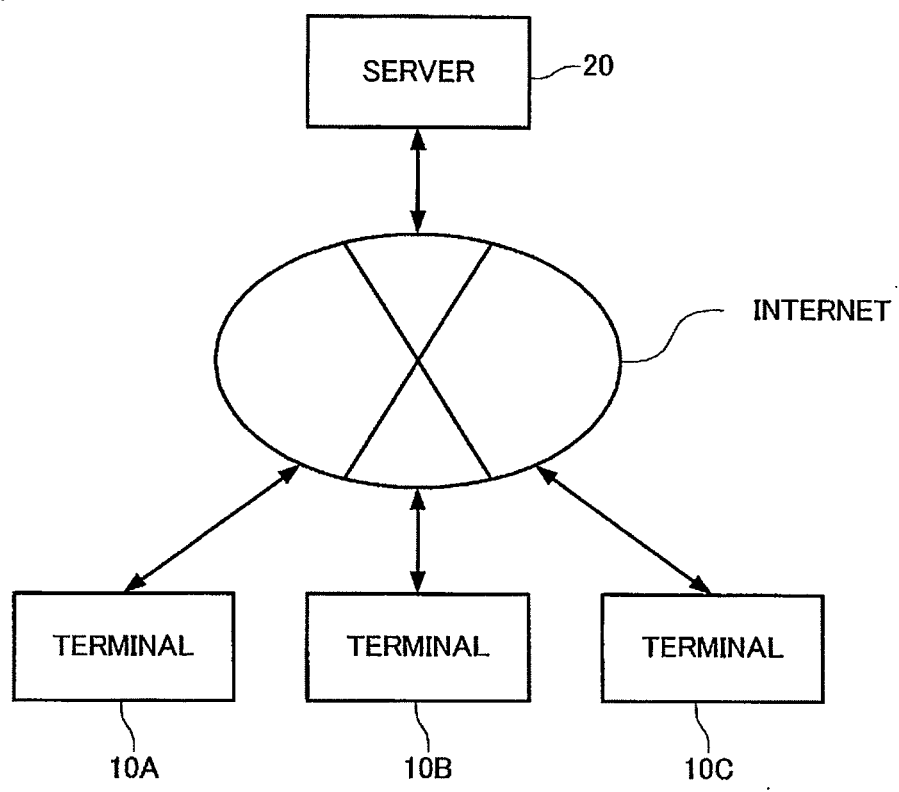
FIG. 1 illustrates an example of a network diagram of a network system according to one embodiment of the invention.

DESCRIPTION OF EMBODIMENTS (1) According to one embodiment of the invention, there is provided a program that causes a server that is connected to a terminal via a network to manage registration of game information, the terminal performing a first game process that utilizes stored game information, and a second game process that utilizes registered game information among the stored game information, the program causing a computer to function as:

a storage section that stores terminal identification information of the terminal and an allowable registration count of the game information for the terminal in a linked manner;

a communication control section that receives data that specifies an update allowable registration count and the terminal identification information of the terminal, the update allowable registration count being linked to a number of pieces of game information acquired through the terminal; and an update section that updates the allowable registration count that is stored while being linked to the terminal identification information corresponding to the received data that specifies the update allowable registration count, the communication control section transmitting a registration permission notification to the terminal upon reception of a game information registration request from the terminal when the allowable registration count corresponding to the terminal identification information of the terminal is equal to or larger than a given number, and transmitting a registration non-permission notification to the terminal upon reception of the game information registration request from the terminal when the allowable registration count corresponding to the terminal identification information of the terminal is less than the given number, and the update section decrementing the allowable registration count when the communication control section has transmitted the registration permission notification to the terminal.

According to one embodiment of the invention, there is provided a computer-readable information storage medium storing the above program.

The game information is character information and the like.

According to one embodiment of the invention, since whether or not to permit registration of the game information is controlled based on the allowable registration count, it is possible to prevent illegal acquisition of the game information. According to one embodiment of the invention, it is possible to provide the player with a game service implemented by the first game process. Specifically, the player can play the first game even if the player cannot register the game information, and it is possible to provide the player with a game service that does not cause the player to be dissatisfied.

(2) According to one embodiment of the invention, there is provided a program that causes a server that is connected to a terminal via a network to manage registration of game information, the terminal performing a first game process that utilizes stored game information, and a second game process that utilizes registered game information among the stored game information, the program causing a computer to function as:

a storage section that stores terminal identification information of the terminal and an allowable registration count of the game information for the terminal in a linked manner;

a communication control section that receives serial information acquired together with the game information acquired through the terminal, and the terminal identification information of the terminal; and an update section that updates the allowable registration count corresponding to the terminal identification information based on an update allowable registration count when the serial information is valid, the communication control section transmitting a registration permission notification to the terminal upon reception of a game information registration request from the terminal when the allowable registration count corresponding to the terminal identification information of the terminal is equal to or larger than a given number, and transmitting a registration non-permission notification to the terminal upon reception of the game information registration request from the terminal when the allowable registration count corresponding to the terminal identification information of the terminal is less than the given number, and the update section decrementing the allowable registration count when the communication control section has transmitted the registration permission notification to the terminal.

According to one embodiment of the invention, there is provided a computer-readable information storage medium storing the above program.

According to one embodiment of the invention, since whether or not to permit registration of the game information is controlled based on the allowable registration count, it is possible to prevent illegal acquisition of the game information. According to one embodiment of the invention, it is possible to provide the player with a game service implemented by the first game process. Specifically, the player can play the first game even if the player cannot register the game information, and it is possible to provide the player with a game service that does not cause the player to be dissatisfied.

According to one embodiment of the invention, it is possible to prompt the player to acquire valid serial information. Specifically, when the player desires to update the allowable registration count, the player must acquire valid serial information. The operator can prevent illegal acquisition of the game information by selling valid serial information together with the game information.

(3) In the program and the information storage medium, the communication control section may transmit the registration permission notification to the terminal upon reception of a specific game information registration request from the terminal regardless of whether or not the allowable registration count corresponding to the terminal identification information of the terminal is equal to or larger than the given number, and the update section may not decrement the allowable registration count when the communication control section has transmitted the registration permission notification to the terminal.

(4) In the program and the information storage medium, the update section may not decrement the allowable registration count corresponding to the terminal identification information of the terminal upon reception of the game information registration request from the terminal when the game information of the game information registration request has been registered.

(5) According to one embodiment of the invention, there is provided a program that causes a terminal to perform a game process, the program causing a computer to function as:

a storage section that stores an allowable registration count of game information;

an acquisition section that acquires the game information and an update allowable registration count that indicates a same number as a number of pieces of the acquired game information;

a first game processing section that performs a first game process based on the acquired game information;

a registration section that registers the game information under a given condition upon reception of a game information registration request;

a second game processing section that performs a second game process based on the registered game information; and an update section that updates the allowable registration count corresponding to the acquired update allowable registration count, the registration section registering the game information when the allowable registration count is equal to or larger than a given number, and not registering the game information when the allowable registration count is less than the given number, and the update section decrementing the allowable registration count when the game information has been registered.

According to one embodiment of the invention, there is provided a computer-readable information storage medium storing the above program.

According to one embodiment of the invention, since whether or not to permit registration of the game information is controlled based on the allowable registration count, it is possible to prevent illegal acquisition of the game information. According to one embodiment of the invention, it is possible to provide the player with a game service implemented by the first game process. Specifically, the player can play the first game even if the player cannot register the game information, and it is possible to provide the player with a game service that does not cause the player to be dissatisfied.

(6) According to one embodiment of the invention, there is provided a program that causes a terminal to perform a game process, the program causing a computer to function as:

a storage section that stores an allowable registration count of game information;

an acquisition section that acquires the game information and serial information;

a first game processing section that performs a first game process based on the acquired game information;

a registration section that registers the game information under a given condition upon reception of a game information registration request;

a second game processing section that performs a second game process based on the registered game information; and an update section that updates the allowable registration count based on the update allowable registration count corresponding to the serial information when the acquired serial information is valid, the registration section registering the game information when the allowable registration count is equal to or larger than a given number, and not registering the game information when the allowable registration count is less than the given number, and the update section decrementing the allowable registration count when the game information has been registered.

According to one embodiment of the invention, there is provided a computer-readable information storage medium storing the above program.

According to one embodiment of the invention, since whether or not to permit registration of the game information is controlled based on the allowable registration count, it is possible to prevent illegal acquisition of the game information. According to one embodiment of the invention, it is possible to provide the player with a game service implemented by the first game process. Specifically, the player can play the first game even if the player cannot register the game information, and it is possible to provide the player with a game service that does not cause the player to be dissatisfied.

According to one embodiment of the invention, it is possible to prompt the player to acquire valid serial information. Specifically, when the player desires to update the allowable registration count, the player must acquire valid serial information. The operator can prevent illegal acquisition of the game information by selling valid serial information together with the game information.

(7) In the program and the information storage medium, the registration section may register specific game information upon reception of a specific game information registration request regardless of whether or not the allowable registration count is equal to or larger than the given number, and the update section may not decrement the allowable registration count when the specific game information has been registered.

(8) In the program and the information storage medium, the update section may not decrement the allowable registration count upon reception of the game information registration request when the game information has been registered.

(9) According to one embodiment of the invention, there is provided a server that is connected to a terminal via a network, and manages registration of game information, the terminal performing a first game process that utilizes stored game information, and a second game process that utilizes registered game information among the stored game information, the server including:

a storage section that stores terminal identification information of the terminal and an allowable registration count of the game information for the terminal in a linked manner;

a communication control section that receives data that specifies an update allowable registration count and the terminal identification information of the terminal, the update allowable registration count being linked to a number of pieces of game information acquired through the terminal; and an update section that updates the allowable registration count that is stored while being linked to the terminal identification information corresponding to the received data that specifies the update allowable registration count, the communication control section transmitting a registration permission notification to the terminal upon reception of a game information registration request from the terminal when the allowable registration count corresponding to the terminal identification information of the terminal is equal to or larger than a given number, and transmitting a registration non-permission notification to the terminal upon reception of the game information registration request from the terminal when the allowable registration count corresponding to the terminal identification information of the terminal is less than the given number, and the update section decrementing the allowable registration count when the communication control section has transmitted the registration permission notification to the terminal.

(10) According to one embodiment of the invention, there is provided a server that is connected to a terminal via a network, and manages registration of game information, the terminal performing a first game process that utilizes stored game information, and a second game process that utilizes registered game information among the stored game information, the server including:

a storage section that stores terminal identification information of the terminal and an allowable registration count of the game information for the terminal in a linked manner;

a communication control section that receives serial information acquired together with the game information acquired through the terminal, and the terminal identification information of the terminal; and an update section that updates the allowable registration count corresponding to the terminal identification information based on an update allowable registration count when the serial information is valid, the communication control section transmitting a registration permission notification to the terminal upon reception of a game information registration request from the terminal when the allowable registration count corresponding to the terminal identification information of the terminal is equal to or larger than a given number, and transmitting a registration non-permission notification to the terminal upon reception of the game information registration request from the terminal when the allowable registration count corresponding to the terminal identification information of the terminal is less than the given number, and the update section decrementing the allowable registration count when the communication control section has transmitted the registration permission notification to the terminal.

(11) According to one embodiment of the invention, there is provided a terminal that performs a game process, the terminal including:

a storage section that stores an allowable registration count of game information;

an acquisition section that acquires the game information and an update allowable registration count that indicates a same number as a number of pieces of the acquired game information;

a first game processing section that performs a first game process based on the acquired game information;

a registration section that registers the game information under a given condition upon reception of a game information registration request;

a second game processing section that performs a second game process based on the registered game information; and an update section that updates the allowable registration count corresponding to the acquired update allowable registration count, the registration section registering the game information when the allowable registration count is equal to or larger than a given number, and not registering the game information when the allowable registration count is less than the given number, and the update section decrementing the allowable registration count when the game information has been registered.

(12) According to one embodiment of the invention, there is provided a terminal that performs a game process, the terminal including:

a storage section that stores an allowable registration count of game information;

an acquisition section that acquires the game information and serial information;

a first game processing section that performs a first game process based on the acquired game information;

a registration section that registers the game information under a given condition upon reception of a game information registration request;

a second game processing section that performs a second game process based on the registered game information; and an update section that updates the allowable registration count based on the update allowable registration count corresponding to the serial information when the acquired serial information is valid, the registration section registering the game information when the allowable registration count is equal to or larger than a given number, and not registering the game information when the allowable registration count is less than the given number, and the update section decrementing the allowable registration count when the game information has been registered.

(13) According to one embodiment of the invention, there is provided a network system including a server and a terminal, the server and the terminal exchanging data via a network, the terminal including:

a storage section that stores an allowable registration count of game information;

an acquisition section that acquires the game information and serial information;

a first game processing section that performs a first game process based on the acquired game information;

a registration section that registers the game information under a given condition upon reception of a game information registration request;

a second game processing section that performs a second game process based on the registered game information;

a communication control section that transmits terminal identification information of the terminal and the serial information to the server; and an update section that updates the allowable registration count of the game information, the server including:

a storage section that stores a registration limit count of the game information so that the registration limit count is linked to the terminal identification information of the terminal;

a communication control section that receives the terminal identification information of the terminal and the serial information from the terminal; and an update section that determines whether or not the received serial information is valid, and updates the registration limit count corresponding to the terminal identification information based on an update allowable registration count corresponding to the serial information when the received serial information is valid, the communication control section of the server transmitting the registration limit count corresponding to the terminal identification information of the terminal to the terminal in response to a request from the terminal, the communication control section of the terminal receiving the registration limit count from the server, the update section of the terminal updating the allowable registration count based on the registration limit count upon reception of the registration limit count from the server, the registration section of the terminal registering the game information when the allowable registration count is equal to or larger than a given number, and not registering the game information when the allowable registration count is less than the given number, and the update section of the terminal decrementing the allowable registration count when the game information has been registered.

According to one embodiment of the invention, since whether or not to permit registration of the game information is controlled based on the allowable registration count, it is possible to prevent illegal acquisition of the game information. According to one embodiment of the invention, it is possible to provide the player with a game service implemented by the first game process. Specifically, the player can play the first game even if the player cannot register the game information, and it is possible to provide the player with a game service that does not cause the player to be dissatisfied.

According to one embodiment of the invention, it is possible to prompt the player to acquire valid serial information. Specifically, when the player desires to update the allowable registration count, the player must acquire valid serial information. The operator can prevent illegal acquisition of the game information by selling valid serial information together with the game information.

According to one embodiment of the invention, since the server stores the registration limit count, the player can again register the game information corresponding to the registration limit count even when the game information registered in the terminal has been lost.

Exemplary embodiments of the invention are described below. Note that the following exemplary embodiments do not unduly limit the scope of the invention as stated in the claims. Note also that all of the elements described below in connection with the following exemplary embodiments should not necessarily be taken as essential elements of the invention.

1. Network System

FIG. 1 illustrates a network system according to one embodiment of the invention. The network system includes a plurality of terminals 10 and a server 20. As illustrated in FIG. 1, the network system is configured so that the server 20 that provides a service and the terminals 10 can be connected to a network (e.g., the Internet).

The terminal 10 is an information processing device such as a portable terminal (e.g., mobile phone, PHS terminal, smartphone, PDA, or portable game machine), a personal computer (PC), a game device, or an image generation device, and can connect to the server 20 via a network (e.g., Internet (WAN) and LAN). The terminal 10 and the server 20 may be connected via a cable communication channel or a wireless communication channel.

2. Configuration 2.1. Configuration of Terminal

Figure 2:
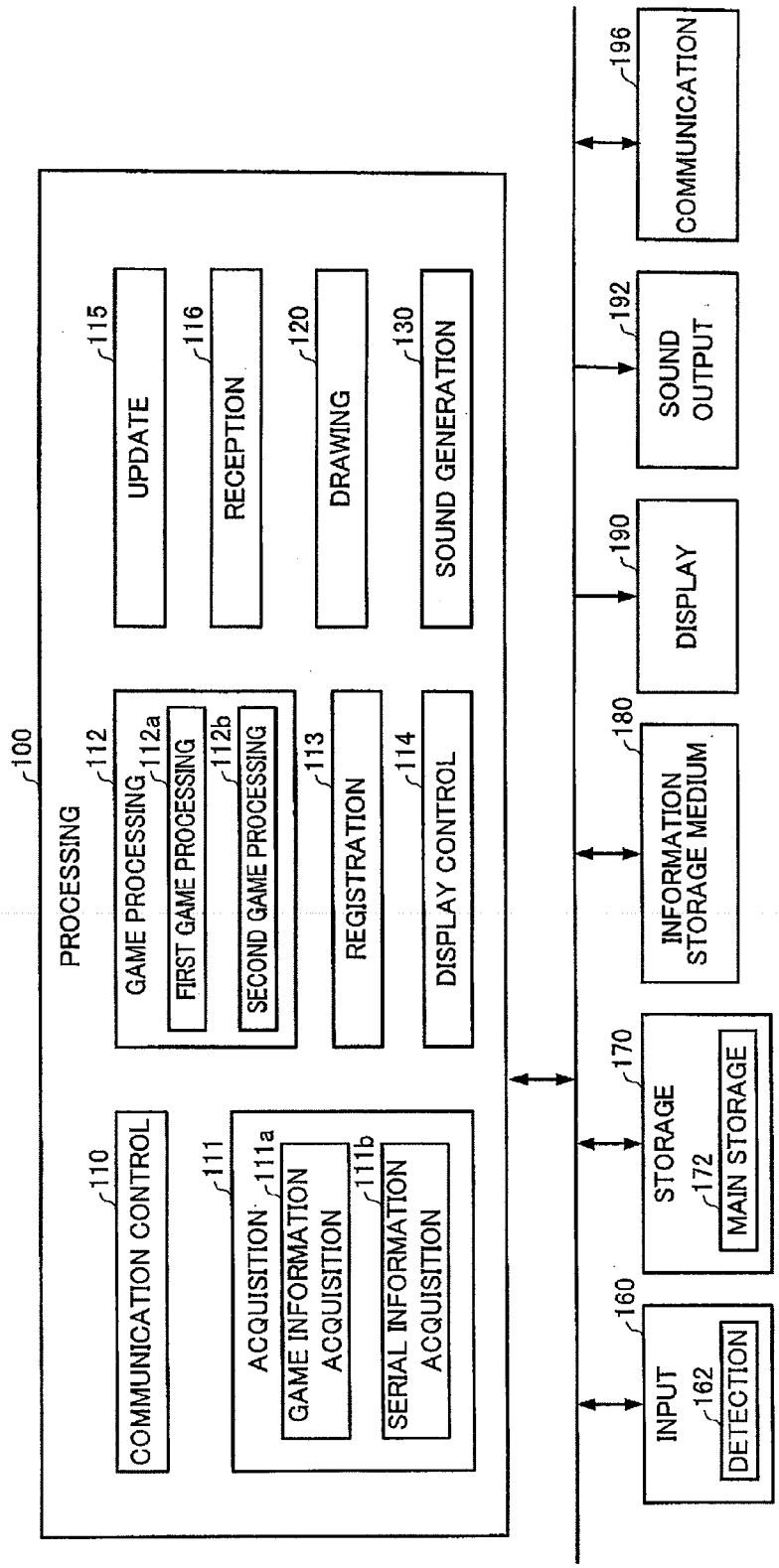
FIG. 2 is a functional block diagram of a terminal according to one embodiment of the invention.

FIG. 2 illustrates an example of a functional block diagram of the terminal according to one embodiment of the invention. Note that the terminal according to one embodiment of the invention may have a configuration in which some of the elements (sections) illustrated in FIG. 2 are omitted.

An input section 160 allows the player to input information, and outputs the input information input by the player to a processing section. The input section 160 includes a detection section 162 that detects the input information (input signal) input by the player. The input section 160 may include a lever, a button, a steering wheel, a microphone, a touch panel display, a keyboard, a mouse, and the like.

The input section 160 may be an input device that includes an acceleration sensor that detects three-axis accelerations, a gyrosensor that detects angular velocity, and an imaging section. For example, the input device may be operated by the player in a state in which the input device is held or worn by the player. The term "input device" used herein includes a controller that imitates a tool such as a sword-type controller or a gun-type controller that is held by the player, or a glove-type controller that is worn by the player. The term "input device" also includes a game device, a portable game device, a mobile phone, a smartphone, and the like that are integrated with the input device. The terminal according to one embodiment of the invention may include a plurality of input sections 160.

A storage section 170 serves as a work area for a processing section 100, a communication section 196, and the like. The function of the storage section 170 may be implemented by a RAM (VRAM) or the like. A registration limit count, a registration count, and an allowable registration count of the game information are stored in the storage section 170.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like. The processing section 100 performs various processes according to one embodiment of the invention based on a program (data) stored in the information storage medium 180. A program that causes a computer to function as each section according to one embodiment of the invention (i.e., a program that causes a computer to execute the process of each section) may be stored in the information storage medium 180.

The terminal receives a program and game data that cause a computer to function as each section according to one embodiment of the invention that are stored in an information storage medium 280 or a storage section 270 included in the server 20 via a network, and stores the received program and data in the information storage medium 180. The terminal may store the program and data received from the server 20 in the storage section 170. A case where the terminal (network system) is operated based on a program and data received from the server 20 is also included within the scope of the invention.

A display section 190 outputs an image generated according to one embodiment of the invention. The function of the display section 190 may be implemented by a CRT, an LCD, a touch panel display, a head-mounted display (HMD), or the like. A sound output section 192 outputs a sound generated according to one embodiment of the invention. The function of the sound output section 192 may be implemented by a speaker, a headphone, or the like.

The communication section 196 performs a control process for communicating with the outside (e.g., another terminal or server). The function of the communication section 196 may be implemented by hardware such as a processor or a communication ASIC, a program, or the like.

The processing section 100 (processor) performs a game process, an image generation process, a sound generation process, and the like based on the input information output from the input section 160, a program, and the like.

The processing section 100 performs various processes using the main storage section 172 of the storage section 170 as a work area. The function of the processing section 100 may be implemented by hardware such as a processor (e.g., CPU or DSP) or an ASIC (e.g., gate array), or a program.

The processing section 100 includes a communication control section 110, an acquisition section 111, a game processing section 112, a registration section 113, a display control section 114, an update section 115, a reception section 116, a drawing section 120, and a sound generation section 130. Note that the processing section 100 may have a configuration in which some of these sections are omitted.

The communication control section 110 exchanges data with the server 20. For example, the communication control section 110 exchanges data with the server 20 by designating the IP address or the port number of the server 20. The communication control section 110 stores data received from the server 20 in the storage section 170, analyzes the received data, and performs a data transmission/reception control process, for example. The communication control section 110 may store destination information (IP address and port number) about the server in the information storage medium 180, and manage the destination information. The communication control section 110 may communicate with the server 20 when the communication control section 110 has received communication start input information from the user.

The communication control section 110 may transmit identification information about the user to the server 20, and receive user information data (web page of the user) from the server 20.

The communication control section 110 may generate a packet including data at an image drawing frame rate, and transmit the generated packet to the server 20. For example, the communication control section 110 may transmit a packet to the server 20 every 1/60th of a second.

The communication control section 110 may receive a game processing result (battle win-lose determination result) from the server 20 via a network.

The communication control section 110 accesses the server 20, and receives a registration limit count from the server 20, the registration limit count being the number of pieces of game information that can be registered for a second game process. The communication control section 110 may transmit the acquired serial information to the server 20.

The acquisition section 111 includes a game information acquisition section 111a and a serial information acquisition section 111b.

The game information acquisition section 111a acquires the game information used for the game process.

The serial information acquisition section 111b acquires the serial information for controlling the registration limit count and the allowable registration count.

The game processing section 112 performs a game calculation process. For example, the game processing section 112 starts the game when a game start condition has been satisfied, proceeds with the game, and terminates the game when a game finish condition has been satisfied.

The game processing section 112 may dispose an object (i.e., an object formed by a primitive such as a polygon, a free-form surface, or a subdivision surface) that represents a display object (e.g., player character, building, stadium, car, tree, pillar, wall, or map (topography)) in an object space.

The term "object space" used herein refers to a virtual space, and includes a two-dimensional space and a three-dimensional space. The term "two-dimensional space" used herein refers to a space in which the object is disposed at two-dimensional coordinates (X, Y), and the term "three-dimensional space" used herein refers to a space in which the object is disposed at three-dimensional coordinates (X, Y, Z), for example. When the object space is a three-dimensional space, the game processing section 112 disposes the object in a world coordinate system. For example, the game processing section 112 determines the position and the rotation angle (synonymous with orientation or direction (e.g., the rotation angle when the object is rotated clockwise around each of the X, Y, and Z axes in the world coordinate system)) of the object in the world coordinate system, and disposes the object at the determined position (X, Y, Z) and the determined rotation angle (rotation angles around the X, Y, and Z axes).

The game processing section 112 may move a player character in the object space, for example. Specifically, the game processing section 112 may cause the player character to move or make a motion (animation) in the object space based on the input information input by the player using the input section 160, a program (movement/motion algorithm), data (motion data), and the like. More specifically, the game processing section 112 may sequentially calculate movement information (movement parameters such as the position, rotation angle, speed, and acceleration) and motion information (position or rotation angle of each part that forms the object) about the player character every frame (e.g., 1/60th of a second). Note that the term "frame" used herein refers to a time unit employed when performing the player character movement/motion process or the image generation process.

The game processing section 112 includes a first game processing section 112a and a second game processing section 112b.

The first game processing section 112a performs a first game process (effect process) based on the acquired game information.

The second game processing section 112b performs a second game process (battle process) based on the game information for the second game process.

The registration section 113 registers the game information under a given condition upon reception of a game information registration request. The registration section 113 registers the game information when the allowable registration count is equal to or larger than a given number (e.g., 1), and does not register the game information when the allowable registration count is less than the given number (e.g., 0). Specifically, the registration section 113 compares the registration count with the registration limit count, and registers the acquired game information based on the comparison result. For example, the registration section 113 registers the acquired game information when the registration count is smaller than the registration limit count.

The display control section 114 displays the details of the game process performed by the game processing section 112, and displays an image generated by the drawing section 120 on the display section 190.

The display control section 114 may display data (e.g., web data, HTML format data, or web content data) received from the server 20 on the display section 190 using a browser or the like. The term "web content data" refers to graphics data and animation data, for example. The web content data may be replayed using the web browser function of the terminal 10.

The update section 115 updates the registration limit count, the registration count, and the allowable registration count of the game information. For example, when the registration limit count corresponding to the terminal identification information of the terminal 10 has been received from the server 20, the update section 115 updates the received registration limit count, and updates the registration count and the allowable registration count based on the registration limit count.

The reception section 116 receives the game information registration request. For example, the reception section 116 receives given input information as the game information registration request. More specifically, the reception section 116 receives touch operation input information detected within a given input area of the display screen as the game information registration request.

The drawing section 120 performs a drawing process based on the results of various processes (e.g., game process) performed by the processing section 100 to generate an image, and outputs the generated image to the display section 190. The drawing section 120 may generate a two-dimensional image, or may generate a three-dimensional image.

When the drawing section 120 generates a two-dimensional image, the drawing section 120 generates an image viewed sideways. For example, the drawing section 120 sets a priority to each object (sprite), and sequentially draws the objects in ascending order of priority. When the objects overlap, the drawing section 120 draws the object with a higher priority over the object with a lower priority.

When generating a three-dimensional game image, the drawing section 120 receives object data (model data) including vertex data (e.g., vertex position coordinates, texture coordinates, color data, normal vector, or alpha-value) about each vertex of the object (model), and performs a vertex process (shading using a vertex shader) based on the vertex data included in the received object data. When performing the vertex process, the drawing section 120 may perform a vertex generation process (tessellation, surface division, or polygon division) for dividing the polygon, if necessary.

The drawing section 120 implements the vertex process by performing a vertex movement process and a geometric process such as coordinate transformation (world coordinate transformation or camera coordinate transformation), clipping, or perspective transformation based on a vertex processing program (vertex shader program or first shader program), and changing (updating or adjusting) the vertex data of each vertex that forms the object based on the processing results.

The drawing section 120 then performs a rasterization process (scan conversion) based on the vertex data changed by the vertex process so that the surface of the polygon (primitive) is linked to pixels. The drawing section 120 then performs a pixel process (shading using a pixel shader or a fragment process) that draws the pixels that form the image (fragments that form the display screen). The drawing section 120 implements the pixel process by determining the drawing color of each pixel that forms the image by performing various processes such as a texture reading (texture mapping) process, a color data setting/change process, a translucent blending process, and an anti-aliasing process based on a pixel processing program (pixel shader program or second shader program), and outputting (drawing) the drawing color of the object subjected to perspective transformation to a drawing buffer (i.e., a buffer that can store image information corresponding to each pixel (VRAM or rendering target)). Specifically, the pixel process includes a per-pixel process that sets or changes the image information (e.g., color, normal, luminance, and alpha-value) corresponding to each pixel. The drawing section 120 thus generates an image viewed from a virtual camera (viewpoint) in the object space. When a plurality of virtual cameras (viewpoints) are provided, the drawing section 120 may generate an image so that images (segmented images) viewed from the respective virtual cameras are displayed on one screen.

The drawing section 120 controls the virtual camera (viewpoint) for generating an image viewed from a given (arbitrary) viewpoint in the object space. Specifically, the drawing section 120 controls the position (X, Y, Z) or the rotational angle (e.g., the rotational angle of the virtual camera when the virtual camera is rotated clockwise around each of the X, Y, and Z axes) of the virtual camera in the world coordinate system when generating a three-dimensional image. More specifically, the drawing section 120 controls the viewpoint position, the line-of-sight direction, and the angle of view of the virtual camera. The drawing section 120 may rotate the virtual camera by a given rotation angle. In this case, the drawing section 120 controls the virtual camera based on virtual camera data that specifies the position or the rotation angle of the virtual camera. When a plurality of virtual cameras (viewpoints) are provided, the drawing section 120 performs the above control process on each virtual camera.

For example, when photographing the object (e.g., player character) from behind using the virtual camera, the drawing section 120 controls the position or the direction of the virtual camera so that the virtual camera follows a change in the position or the direction of the object. In this case, the drawing section 120 may control the virtual camera based on information about the position, direction, speed, and the like of the object obtained by the game processing section 112. Alternatively, the drawing section 120 may set the virtual camera in a predetermined direction, or may move the virtual camera along a predetermined path. In this case, the drawing section 120 controls the virtual camera based on virtual camera data that specifies the position (moving path) or the direction of the virtual camera. When a plurality of virtual cameras (viewpoints) are provided, the drawing section 112 performs the above control process on each virtual camera.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process to increase the degree of freedom of the drawing process so that the representation capability can be significantly improved as compared with a fixed drawing process using hardware.

The drawing section 120 performs a geometric process, texture mapping, a hidden surface removal process, alpha-blending, and the like when drawing the object.

The drawing section 120 implements the geometric process by subjecting the object to coordinate transformation, clipping, perspective projection transformation, light source calculation, and the like. The object data (e.g., vertex position coordinates, texture coordinates, color data (luminance data), normal vector, or alpha-value) subjected to the geometric process (perspective transformation) is stored in an object data storage section.

The term "texture mapping" refers to a process that maps a texture (texel value) stored in a texture storage section of the storage section 170 onto the object. Specifically, the drawing section 120 reads a texture (surface properties such as color (RGB) and alpha-value) from the texture storage section of the storage section 170 using the texture coordinates set (assigned) to the vertices of the object and the like. The drawing section 120 then maps the texture (two-dimensional image) onto the object. In this case, the drawing section 120 performs a pixel-texel association process, a bilinear interpolation process (texel interpolation process), and the like.

The drawing section 120 may perform a hidden surface removal process by a Z-buffer method (depth comparison method or Z-test) using a Z-buffer (depth buffer) that stores the Z-value (depth information) of the drawing pixel. More specifically, the drawing section 120 refers to the Z-value stored in the Z-buffer when drawing the drawing pixel corresponding to the primitive of the object. The drawing section 120 then compares the Z-value stored in the Z-buffer with the Z-value of the drawing pixel of the primitive. When the Z-value of the drawing pixel is the Z-value in front of the virtual camera (e.g., a small Z-value), the drawing section 120 draws the drawing pixel and updates the Z-value stored in the Z-buffer with a new Z-value.

The term "alpha-blending" refers to a translucent blending process (e.g., normal alpha-blending, additive alpha-blending, or subtractive alpha-blending) based on the alpha-value (A value).

Note that the alpha-value is information that can be stored corresponding to each pixel (texel or dot), such as additional information other than the color information. The alpha-value may be used as mask information, translucency (equivalent to transparency or opacity), bump information, or the like.

The sound generation section 130 performs a sound generation process based on the results of various processes performed by the processing section 100 to generate a game sound such as background music (BGM), effect sound, or voice, and outputs the generated game sound to the sound output section 192. For example, the sound generation section 130 may output sound data received from the server 20 to the sound output section 192.

2.2. Configuration of Server

FIG. 3 illustrates an example of a functional block diagram of the server 20 according to one embodiment of the invention. Note that the server 20 may have a configuration in which some of the elements (sections) illustrated in FIG. 3 are omitted.

A storage section 270 serves as a work area for a processing section 200, a communication section 296, and the like. The function of the storage section 270 may be implemented by a RAM (VRAM) or the like. The storage section 270 includes a main storage section 272 and a memory section 260 (e.g., database).

The memory section 260 (storage section 270) stores the registration limit count of the game information so that the registration limit count is linked to the terminal identification information of the terminal. The memory section 260 (storage section 270) may stores the registration count and the allowable registration count of the game information so that the registration count and the allowable registration count are linked to the terminal identification information of the terminal.

The memory section 260 stores the identification information of the terminal that is managed by the server 20. The memory section 260 may store a user name (user account or user identification information), a user password, an IP address, an e-mail address, a port number, a telephone number, and the like corresponding to the identification information of the terminal.

The memory section 260 may also store notice information posted by the user (player) and information about an item registered corresponding to the identification information about the user as the user information.

An information storage medium 280 (computer-readable medium) stores a program, data, and the like. The function of the information storage medium 280 may be implemented by an optical disk (CD or DVD), a magneto-optical disk (MO), a magnetic disk, a hard disk, a magnetic tape, a memory (ROM), or the like. The processing section 200 performs various processes according to one embodiment of the invention based on a program (data) stored in the information storage medium 280. Specifically, a program that causes a computer to function as each section according to one embodiment of the invention (i.e., a program that causes a computer to execute the process of each section) is stored in the information storage medium 280.

The communication section 296 performs a control process for communicating with the outside (e.g., terminal, another server, or another network system). The function of the communication section 296 may be implemented by hardware such as a processor or a communication ASIC, a program, or the like.

The processing section (processor) 200 performs various processes based on a program stored in the information storage medium 280, and the like. More specifically, the processing section 200 provides a service in response to a request from each terminal.

The processing section 200 performs various processes using a main storage section 272 included in the storage section 270 as a work area. The function of the processing section 200 may be implemented by hardware such as a processor (e.g., CPU or DSP) or an ASIC (e.g., gate array), or a program.

The processing section 200 included in the game server 20 includes a network setting section 210, a communication control section 211, a determination section 213, and an update section 214. Note that the processing section 200 may have a configuration in which some of these sections are omitted.

The network setting section 210 receives the terminal identification information from the terminal 10, and stores network information about the user (player) in the database 260 so that the network information is linked to the received terminal identification information. Note that the terminal identification information is unique information that is assigned on a terminal basis and identifies the terminal.

The communication control section 211 exchanges data with the terminal 10 via a network. Specifically, the communication control section 211 transmits information to the terminal 10 based on a request from the terminal 10 of the player.

For example, the communication control section 211 transmits the registration limit count corresponding to the terminal identification information of the terminal 10 in response to a request from the terminal 10.

The communication control section 211 receives the terminal identification information and the serial information from the terminal 10. The communication control section 211 receives the serial information from the terminal 10. When the registration limit count corresponding to the terminal identification information of the terminal 10 has been changed (e.g., incremented) based on the serial information, the communication control section 211 transmits the resulting registration limit count to the terminal 10.

The update section 214 controls the registration limit count corresponding to the terminal identification information about each terminal. For example, the update section 214 sets the registration limit count to 0 as an initial value. The update section 214 determines whether or not the serial information received from the terminal 10 is valid, and changes (e.g., increments) the registration limit count corresponding to the terminal identification information of the terminal 10 based on the serial information. For example, when a number corresponding to the serial information is "3", the update section 214 adds "3" to the registration limit count corresponding to the terminal identification information of the terminal 10. The update section 214 may refer to a flag corresponding to the serial information, and determine whether or not the serial information is valid.

The update section 214 updates (sets) the validity or the invalidity of the serial information. Specifically, the update section 214 invalidates the serial information. For example, the update section 214 invalidates the serial information when the update section 214 has changed (e.g., incremented) the registration limit count corresponding to the terminal identification information of the terminal 10 based on the received serial information.

3. Process 3.1 Outline

The terminal 10 according to one embodiment of the invention acquires game information from a marker MK of a card 40 (display object in a broad sense) that is old by an operator (game company) (see FIGS. 4A and 4B), and performs a game process based on the acquired game information. For example, when the terminal 10 has acquired the game information including a character A, the terminal 10 performs a first game process that generates an augmented reality image in which the captured image and the character A are synthesized (blended), and performs a second game process in which the player character battles the character A.

When the operator sells a plurality of cards 40 that differ in game information, the selling of the cards 40 may be hindered if the game information stored in each card 40 can be freely acquired from each terminal 10. For example, the operator may lose profits from the game information if the player can illegally acquire the game information without purchasing the card 40 (e.g., by borrowing the card 40 from another player).

The embodiments of the invention prevent a situation in which the player illegally acquires the game information by providing serial information together with the card 40, and allowing the terminal to use the game information on condition that the serial information is used. For example, a printed matter 60 (display object in a broad sense) (see FIG. 5) that records a serial code SC that indicates the serial information is provided to the player.

Specifically, the serial information is unique information when providing the game service according to the embodiments of the invention, and a change count (e.g., update allowable registration count) for changing (e.g., incrementing) the registration limit count up to which the terminal 10 can register the game information, can be determined based on the serial information.

The registration limit count is the maximum registration count (registration limit count or license count) up to which the terminal 10 can register the game information (e.g., the game information used for the second game process).

Figure 6:
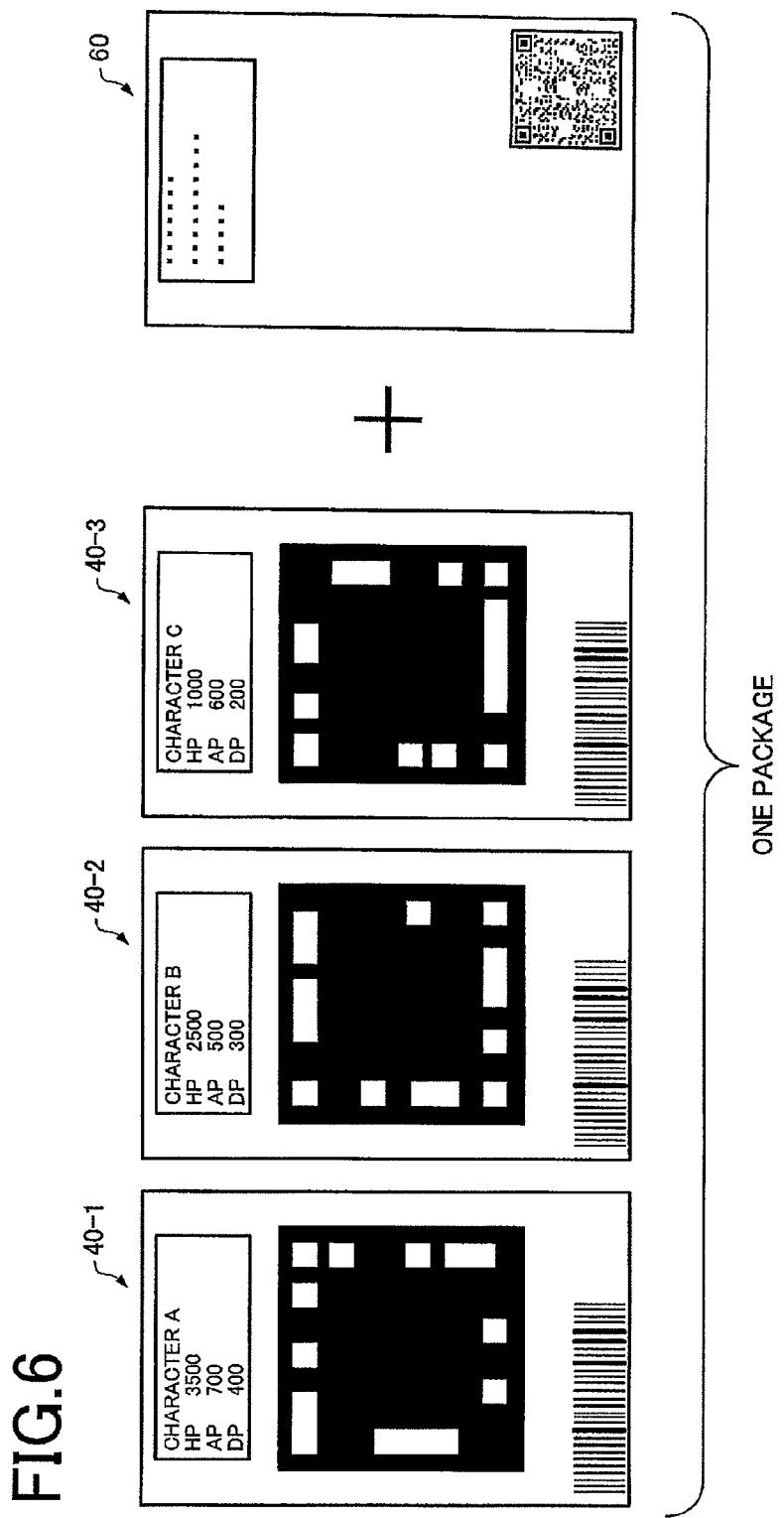
FIG. 6 is a view illustrating a package according to one embodiment of the invention.

For example, the operator sells three cards 40 and a printed matter 60 on which the serial code SC is recorded as one package (see FIG. 6). In this case, the serial code SC is recorded so that the update allowable registration count for incrementing (changing) the registration limit count is equal to or more than the number of cards included in one package (i.e., 3 or more).

For example, when the update allowable registration count corresponding to the serial code SC is "3", and the player has purchased one package, the terminal 10 can register the game information corresponding to three cards, and the player must purchase at least one additional package when the player desires to register four or more cards. The server 20 manages the serial information, and prevents repeated use of the serial information by invalidating the serial information that has been used.

At least a first game process (game effect process) is provided to the player free of charge when the player has acquired the game information, and a second game process (e.g., game battle process) is provided to the player based on the registered game information (i.e., the game information registered as second game process game information).

This makes it possible to provide the first game process to the player free of charge based on the game information provided on the card 40, and allow the player to enjoy the game using the card 40. Since the player must register the game information provided on the card 40 when the player desires to proceed with the second game process, it is possible to prompt the player to obtain valid serial information. Specifically, it is possible to prompt the player to purchase another package. Therefore, the operator can promote the sales of the cards. Since the number of pieces of game information that can be registered in one package is limited to a given number (e.g., "3") that is equal to or larger than the number of cards included in one package, and the serial information can be used only once, it is possible to prevent illegal acquisition of the game information, and further promote the sales of the cards 40.

3.2 Control of Registration Limit Count

The server 20 is configured to control the registration limit count for each terminal 10. For example, the terminal 10 transmits the acquired serial information to the server 20, and the server 20 adds a number (update allowable registration count) corresponding to the serial information to the registration limit count when the server 20 has determined that the serial information is valid, and transmits the registration limit count to the terminal 10. Note that the registration limit count is initially set to "0". Specifically, the registration limit count is set to "0" when the player starts the game using the terminal 10.

FIG. 7 illustrates an example of the registration limit counts managed by the server 20. As illustrated in FIG. 7, the registration limit count is set corresponding to the terminal identification information about each terminal 10. For example, a registration limit count "3" is set to the terminal 10 of which the terminal identification information is "1". In this case, up to three pieces of game information can be registered.

FIG. 8 illustrates an example of the serial information managed by the server 20, and a serial information valid/invalid flag. For example, the serial information "ABC1234" is valid since the flag is set to "1". The serial information "CBD9878" is invalid since the flag is set to "0".

Note that the operator sells a package (i.e., a combination of the cards 40 and the printed matter 60 that records the serial code SC) in a state in which the serial information is valid.

The server 20 calculates the update allowable registration count (change count in a broad sense) for incrementing the registration limit count based on the serial information. The server 20 calculates the number of cards (e.g., "3") per package based on the serial information. Note that the server 20 may store the update allowable registration count in the storage section 270 corresponding to each serial information.

The server 20 invalidates the serial information after adding a number (update allowable registration count) corresponding to the serial information to the registration limit count. For example, when a number (update allowable registration count) corresponding to the serial information "ABC1234" for which the flag is set to "1" is "3", "3" is added to the registration limit count of the terminal 10 having the terminal identification number "1". The server 20 then updates the flag of the serial information "ABC1234" with "0".

FIG. 9 illustrates an example of the registration limit count P, the registration count Q (i.e., the number of pieces of game information that have been registered), and the allowable registration count R (R=P−Q) of the terminal 10. For example, when the registration limit count of the terminal 10 is "3", and two pieces of game information have been registered, the registration count Q is set to "2", and the allowable registration count R is set to "1".

Figure 10:
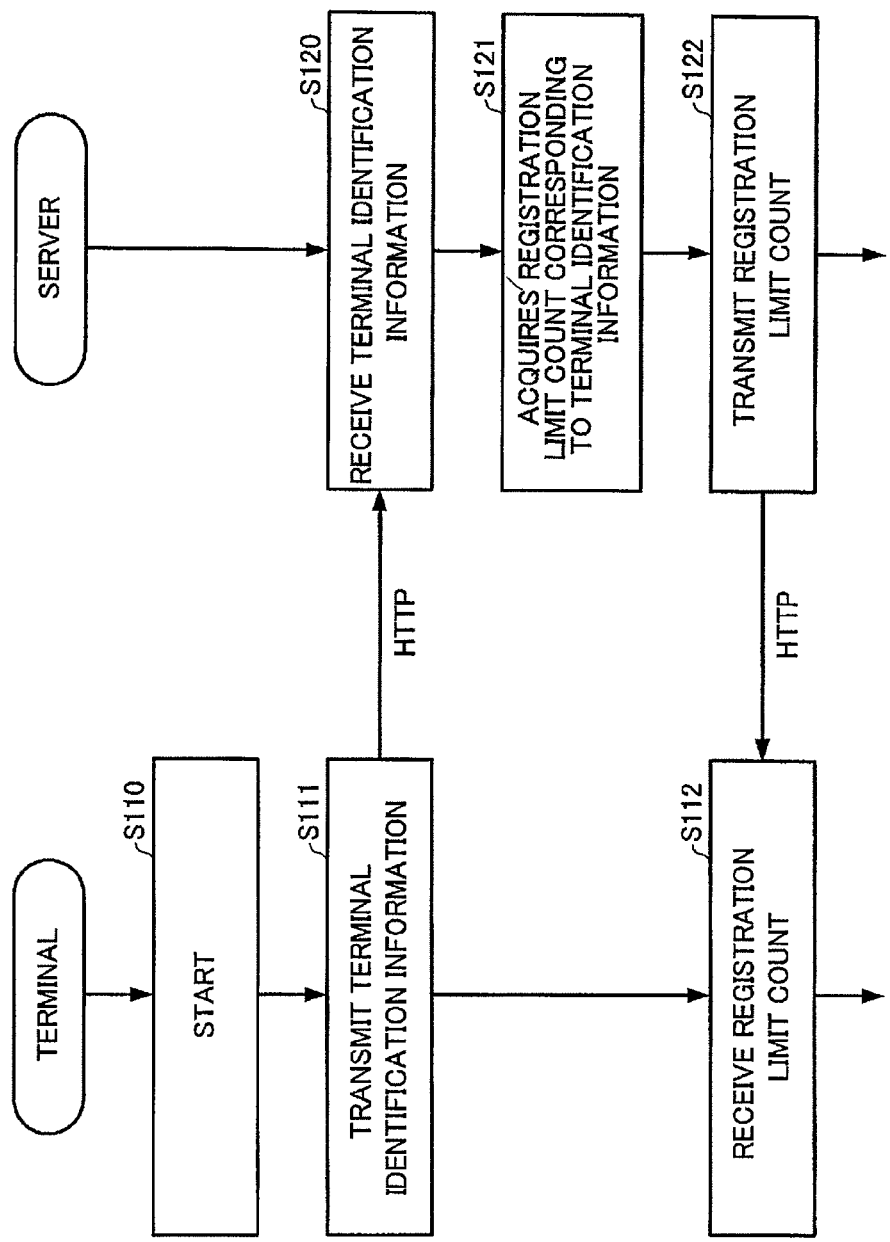
FIG. 10 is a flowchart illustrating communication between a server and a terminal according to one embodiment of the invention.

FIG. 10 illustrates a processing example in which the terminal 10 receives the registration limit count from the server 20 when the game starts. Since the server 20 manages the registration limit count of each terminal, the terminal 10 always acquires the latest information from the server 20 so that discrepancy does not occur between the server 20 and the terminal 10.

In a step S110, the terminal 10 starts the game. The terminal 10 then transmits the terminal identification information to the server 20 (step S111). For example, the terminal 10 transmits the terminal identification information using the Hyper Text Transfer Protocol (HTTP). The server 20 receives the terminal identification information (step S120), and acquires the registration limit count corresponding to the terminal identification information (step S121). The server 20 then transmits the registration limit count to the terminal 10 using HTTP (step S122). The terminal 10 receives the registration limit count (step S112).

Note that recovery information may be retained by the terminal 10 and the server 20 in advance in case the model of the terminal 10 is changed, and the terminal 10 or the server 20 may recover the registration limit count corresponding to the terminal 10 based on the recovery information.

Figure 11:
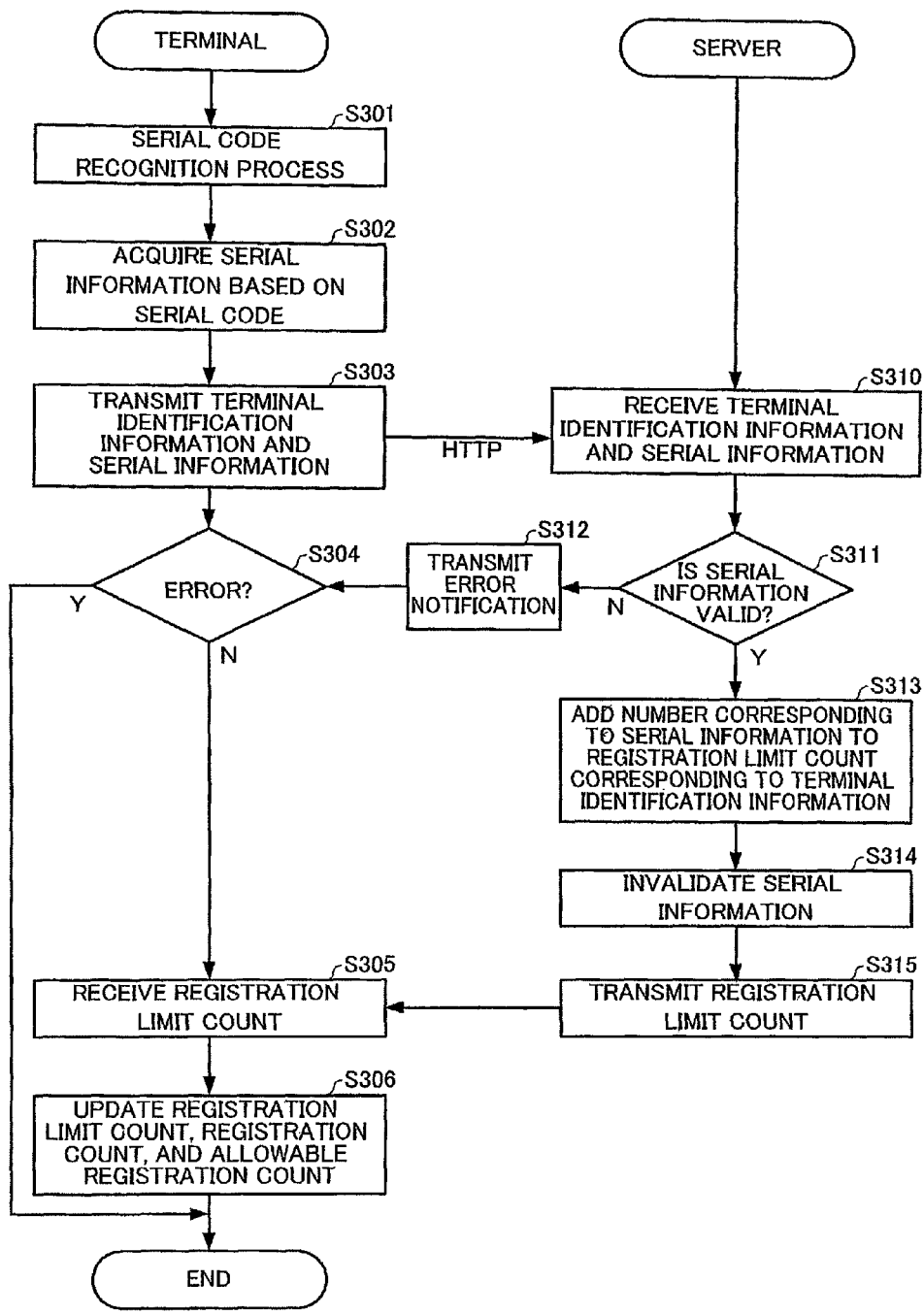
FIG. 11 is a flowchart illustrating communication between a server and a terminal according to one embodiment of the invention.

FIG. 11 illustrates the flow of a process that controls the registration limit count based on the serial information.

Figure 12:
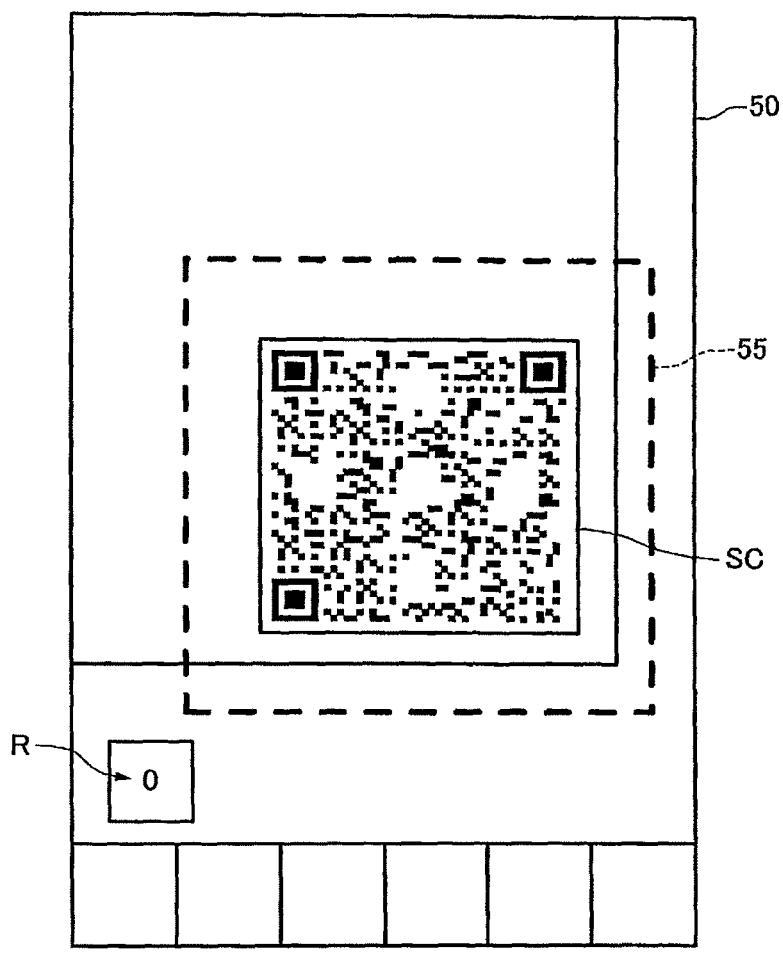
FIG. 12 illustrates an example of a display image according to one embodiment of the invention.

The terminal 10 performs a serial code recognition process (step S301). For example, the imaging section 150 of the terminal 10 captures the serial code SC printed on the printed matter 60, and displays the captured image within the display screen 50 (see FIG. 12). For example, a guide frame 55 for reading the serial code SC may be displayed. Note that the allowable registration count R may be displayed within the display screen 50. In the example illustrated in FIG. 12, since the allowable registration count R is "0", it is necessary to input the serial information (i.e., increment the registration limit count P (allowable registration count R)) in order to register the game information.

The terminal 10 then acquires the serial information based on the recognized serial code (step S302). For example, the terminal 10 analyzes the captured image, and decodes the serial code SC by performing a given decoding process to acquire the serial information.

The terminal 10 then transmits the terminal identification information and the serial information to the server 20 using HTTP (step S303).

The server 20 receives the terminal identification information and the serial information from the terminal 10 (step S310). The server 20 then determines whether or not the serial information is valid (step S311). When the server 20 has determined that the serial information is not valid (N in step S311), the server 20 transmits an error notification to the terminal 10 (step S312). When the server 20 has determined that the serial information is valid (Y in step S311), the server 20 calculates a number (update allowable registration count) corresponding to the serial information, and adds the calculated number to the registration limit count corresponding to the terminal identification information (step S313). The server 20 then invalidates the serial information (step S314), and transmits the registration limit count to the terminal 10 (step S315).

The terminal 10 determines whether or not an error notification has been received from the server 20 (step S304). When the terminal 10 has determined that an error notification has been received from the server 20 (Y in step S304), the terminal 10 terminates the process. When the terminal 10 has determined that an error notification has not been received from the server 20 (N in step S304), the terminal 10 receives the registration limit count (step S305), and updates the registration limit count, the registration count, and the allowable registration count (step S306).

Figures 13, 14:
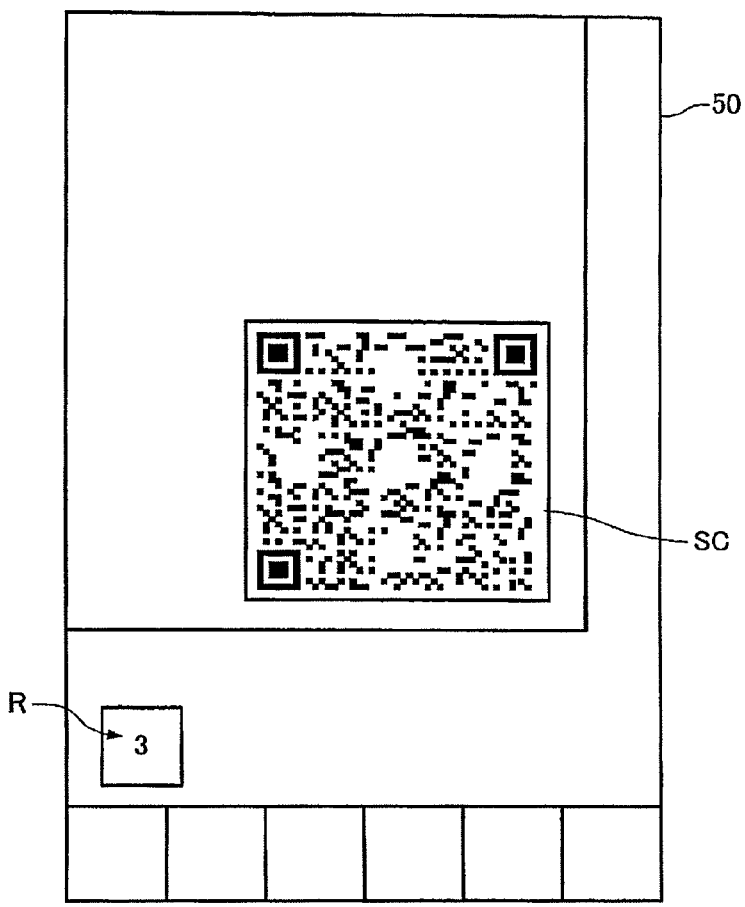
FIG. 13 illustrates an example of a display image according to one embodiment of the invention.
FIG. 14 is a view illustrating a game information registration process according to one embodiment of the invention.

Note that the updated allowable registration count R may be displayed within the display screen 50 of the terminal 10 (see FIG. 13).

3.3 Game Process Based on Game Information

3.3.1 Outline

A game information registration process performed by the terminal 10 is described below.

The terminal 10 recognizes the marker MK from the captured image obtained by capturing the card 40 (display object in a broad sense) using the imaging section 150, and performs the game process based on the game information acquired from the marker MK.

The terminal 10 performs the first game process (e.g., effect process) based on the game information regardless of registration. The terminal 10 can register the acquired game information (i.e., can register the acquired game information as second game Information), and perform the second game process (e.g., battle process) based on the registered game information.

3.3.2 Card

Figure 4A:
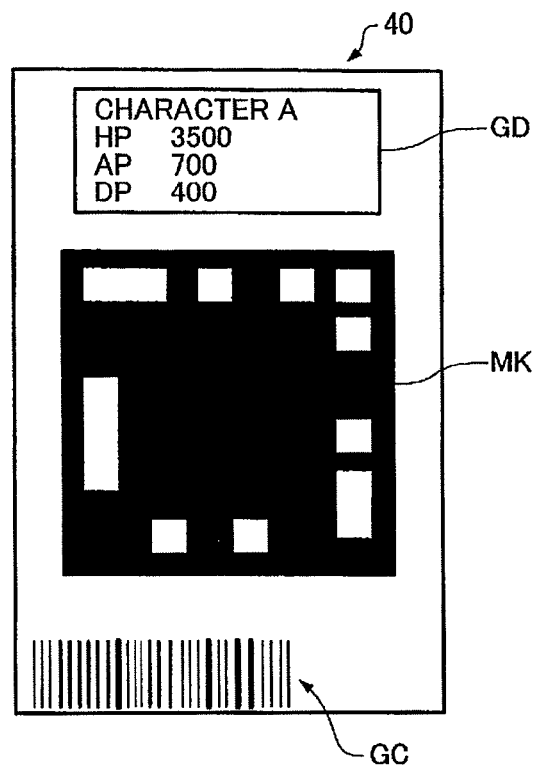
FIG. 4A is a view illustrating a card according to one embodiment of the invention.
Figure 4B:
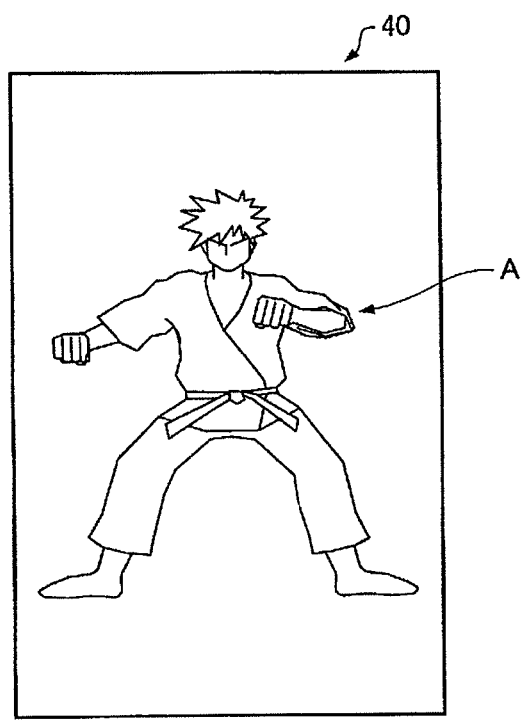
FIG. 4B is a view illustrating a card according to one embodiment of the invention.

The details of the card 40 that records the marker MK are described below. FIGS. 4A and 4B illustrate an example of the card 40 (display object in a broad sense). The terminal 10 captures the card 40 illustrated in FIG. 4A, and recognizes the marker MK displayed on the card 40. The terminal 10 can continuously capture the card 40 in a given cycle (e.g., every 1/60th of a second), and can detect the marker MK in the given cycle.

FIG. 4A illustrates an example of the back side (first side) of the card 40. The game information GD, the marker MK, and the code GC are recorded on the back side of the card 40. The marker MK is indicated in white or black.

For example, the marker MK includes a plurality of squares. Each square is linked to each bit among 16 bits, "1" is indicated in white, and "0" is indicated in black. For example, a 16-bit value that indicates the game information is displayed using the marker MK. Note that the marker MK may be a numerical value, characters, a code (two-dimensional code or barcode), a pictograph, or a pattern.

The game information is information used for the first game process and the second game process. For example, the game information may be character information (e.g., name, strength value, attack value, or defense value of character), battle information, or event information.

A code (e.g., barcode) prepared in accordance with a given standard is recorded as the code GC. The code GC may be displayed using a barcode that indicates a bit value of the game information. Note that the code GC may be a readable code using the housing 30. The code GC may be a two-dimensional code, a marker, a numerical value, characters, a pictograph, or a pattern.

A character A that is recorded in the game information GD may be recorded on the surface (second side) of the display object (see FIG. 4B).

In the example illustrated in FIGS. 4A and 4B, the display object is the card 40 (printed matter). Note that the display object may be a two-dimensional medium (e.g., image, paper, message board, or board) or a three-dimensional display object (e.g., ball, marble, block, or light). When the display object is a display image, the display image may be a two-dimensional image or a stereoscopic image.

Figure 5:
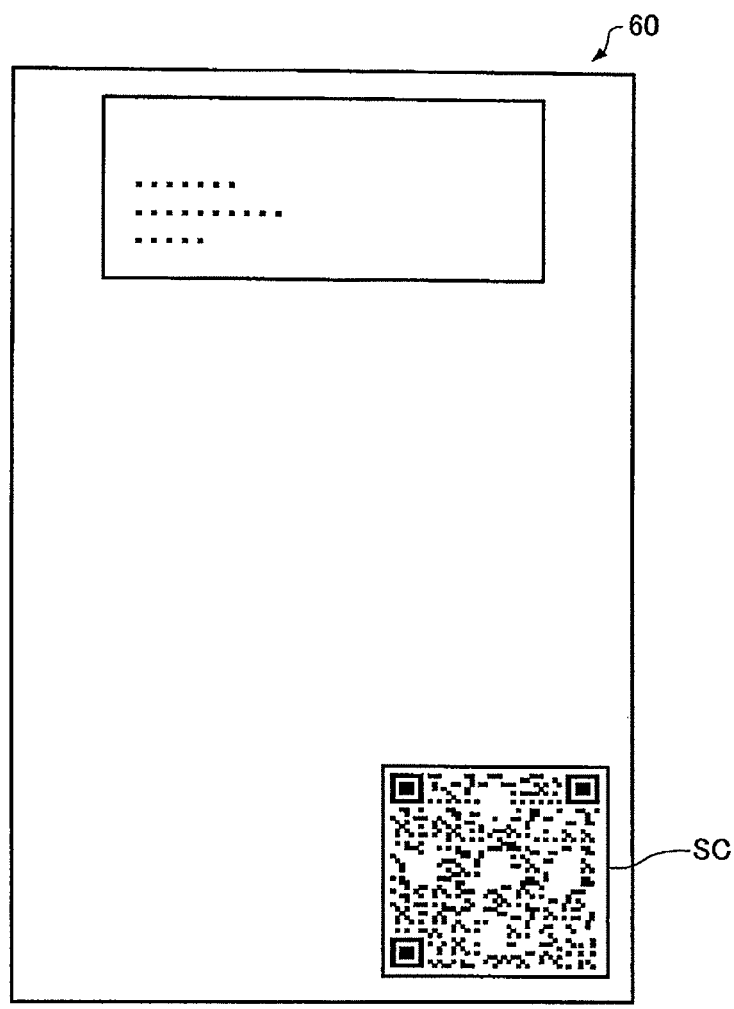
FIG. 5 is a view illustrating serial information according to one embodiment of the invention.

The printed matter 60 illustrated in FIG. 5 is also an example of the display object. The printed matter 60 may be a two-dimensional medium (e.g., image, paper, message board, or board) or a three-dimensional display object (e.g., ball, marble, block, or light). When the printed matter 60 is a display image, the display image may be a two-dimensional image or a stereoscopic image.

3.3.3 Game Information Acquisition Process

A game information acquisition process is described below. When the terminal 10 has recognized the marker MK, the terminal 10 acquires the game information from the marker MK. For example, the terminal 10 acquires the bit value (0 or 1) indicated by the marker MK recorded on the card from the captured image, and acquires the 16-bit value as the game information.

3.3.4 Game Information Registration Process

FIG. 14 illustrates an example in which the terminal 10 registers the game information. FIG. 14 illustrates an example in which the registration limit count P is "3", the registration count Q is "2", the allowable registration count R is "1", and game information A and game information B are registered.

Note that the expression "the terminal 10 registers the game information" means that the terminal 10 stores the game information in the storage section 170 of the terminal 10 as the game information for performing a specific game process (second game process (battle process)). For example, when the terminal 10 has acquired a card 40-1 that records information about the character A, character information and battle information about the character A are registered.

The game information cannot be registered when the registration limit count P has been reached. Specifically, the acquired game information is registered when the registration count (registration count Q) of the game information is less than the registration limit count P (Q<P). In other words, the acquired game information is registered when the allowable registration count R is equal to or larger than 1 (given number), and the acquired game information is not registered when the allowable registration count R is equal to or less than 0 (less than 1 or less than a given number).

For example, when the game information C has been acquired when the registration limit count P is "3" and the registration count Q is "2" (the allowable registration count R is "1"), the game information C is registered. When the game information C has been acquired when the registration limit count P is "3" and the registration count Q is "3" (the allowable registration count R is "0"), the game information C is not registered.

The registration count Q and the allowable registration count R are updated when the game information C has been registered. Specifically, when the game information C has been acquired when the registration limit count P is "3" and the registration count Q is "2" (the allowable registration count R is "1"), the registration count Q is updated with "3", and the allowable registration count R is updated with "0".

The game information may be registered when game information registration request (input information) from the player has been received. When the terminal 10 has received a game information registration request, the terminal 10 does not decrement the allowable registration count when the game information has been registered (e.g., does not decrement the allowable registration count by 1, or does not change the allowable registration count). For example, when the terminal 10 has received a registration request for the game information A (character information about the character A), the terminal 10 determines whether or not the game information A has been registered, and does not decrement the allowable registration count R by 1 when it has been determined that the game information A has been registered. Note that the game information A may be overwritten, or may not be registered when the game information A has been registered.

3.3.5 Game Process

The game process is performed based on the game information. The first game process is described below. The first game process is performed based on the acquired game information regardless of whether or not the game information is registered.

For example, when the game information A has been acquired, an effect process (i.e., first game process) based on the game information A (character A) is performed even when the game information A is not registered in the terminal 10.

As illustrated in FIG. 15, a process that superimposes a captured image and a virtual image to generate an augmented reality image is performed as the effect process (first game process). The term "augmented reality (AR)" refers to technology that adds information to the actual environment using a computer (terminal), and an environment to which information is added.

Figure 16:
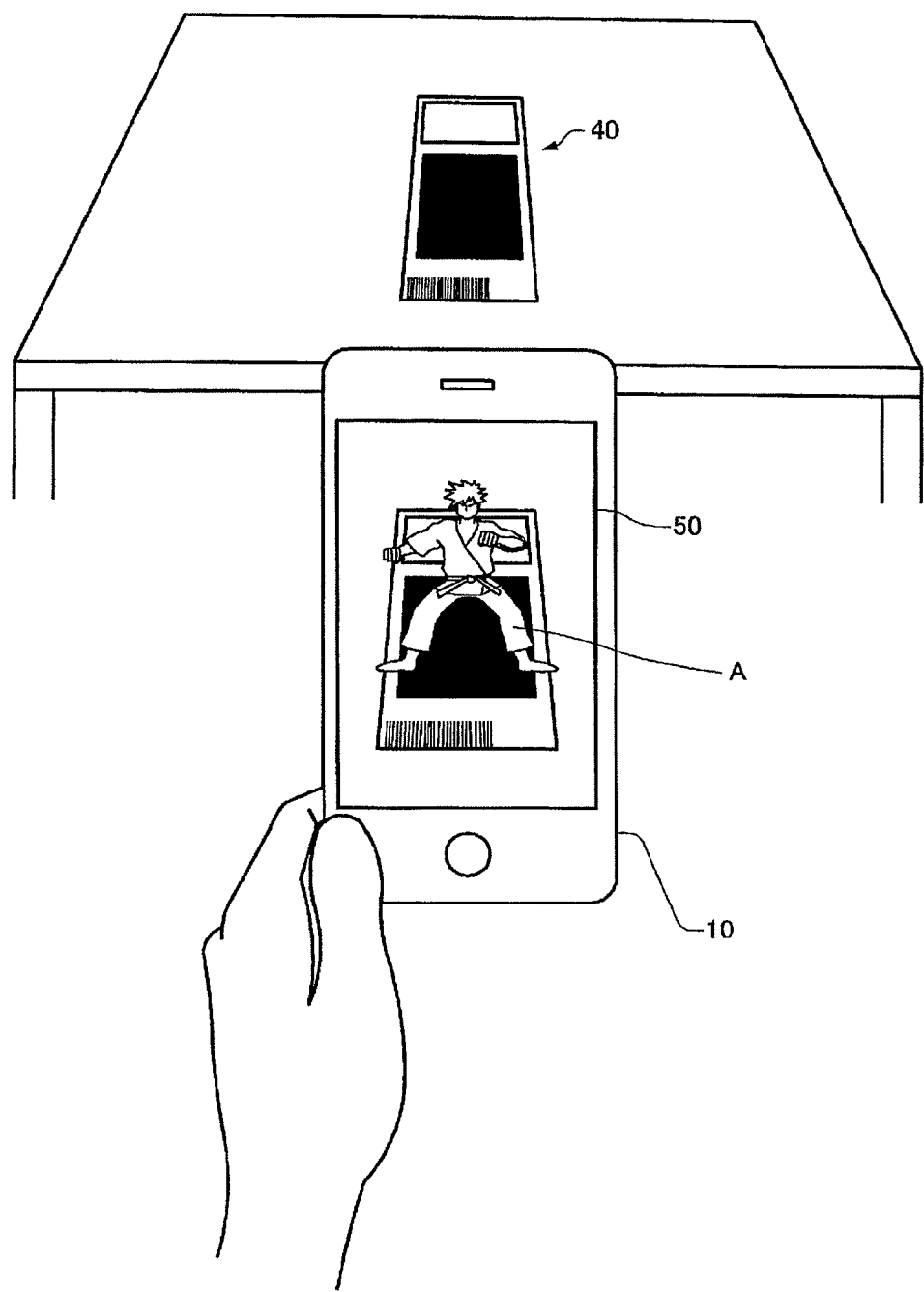
FIG. 16 is a view illustrating an augmented reality image according to one embodiment of the invention.

For example, a captured image captured by the imaging section 150 and a virtual image including the character A specified based on the game information are blended (superimposed) to generate an augmented reality image, and the augmented reality image is displayed as the display image 50 (see FIG. 15). For example, each image of a movie (animation) of the character A and the captured image are blended to generate an augmented reality image (effect process). This makes it possible to provide an augmented reality image as if the virtual character A were present in the real world through the imaging section 150 (see FIG. 16).

Since the marker detection process is performed in a given cycle (e.g., drawing frame rate (1/60th of a second)), the augmented reality image can be generated in real time.

The virtual image used to generate the augmented reality image may be a two-dimensional image, or may be a three-dimensional image viewed from a virtual camera disposed in a virtual three-dimensional space (world coordinate system).

The second game process is described below. A battle process that causes the player character battles with an enemy character is performed as the second game process. For example, the character A registered as the game information may be used as the enemy character, and a player character selected by the player may be caused to battle with the character A. Alternatively, the character A registered as the game information may be used as the player character, and caused to battle with a computer character.

Since a plurality of cards 40 that differ in character are provided in advance, the player is motivated to collect the cards 40, and can enjoy the battle game using various characters obtained by collecting the cards 40.

The player must register the game information acquired from the card 40 in order to play the second game (battle game). Since the player can necessarily reflect the game information recorded on the card 40 in the terminal 10 by purchasing a package of the cards 40 and the serial information, it is possible to provide the second game without causing the player to be dissatisfied.

The player can also enjoy observing the augmented reality image based on the game information acquired from the card 40 by exchanging the card 40 with his friend, and enjoy the game effect using the card 40 regardless of whether or not the game information is registered.

3.3.6 Exception Handling Process on Specific Game Information

When specific game information D has been acquired from a campaign card, the specific game information D may be registered regardless of the registration limit count P and the allowable registration count R. For example, when exception information has been added to the game information D, the game information D may be registered regardless of whether or not the allowable registration count R is equal to or larger than 1 (given number). Specifically, the game information D may be registered even when the allowable registration count R is 0 (less than the given number). When the game information D has been registered when the allowable registration count R is equal to or larger than 1 (given number), the registration count Q and the allowable registration count R are not updated. Specifically, when the specific game information D has been registered, the allowable registration count is not decremented (e.g., the allowable registration count is not decremented by 1, or the allowable registration count is not changed). This makes it possible to provide a service that provides specific game information.

3.3.7 Flowchart of Registration Process

Figure 17:
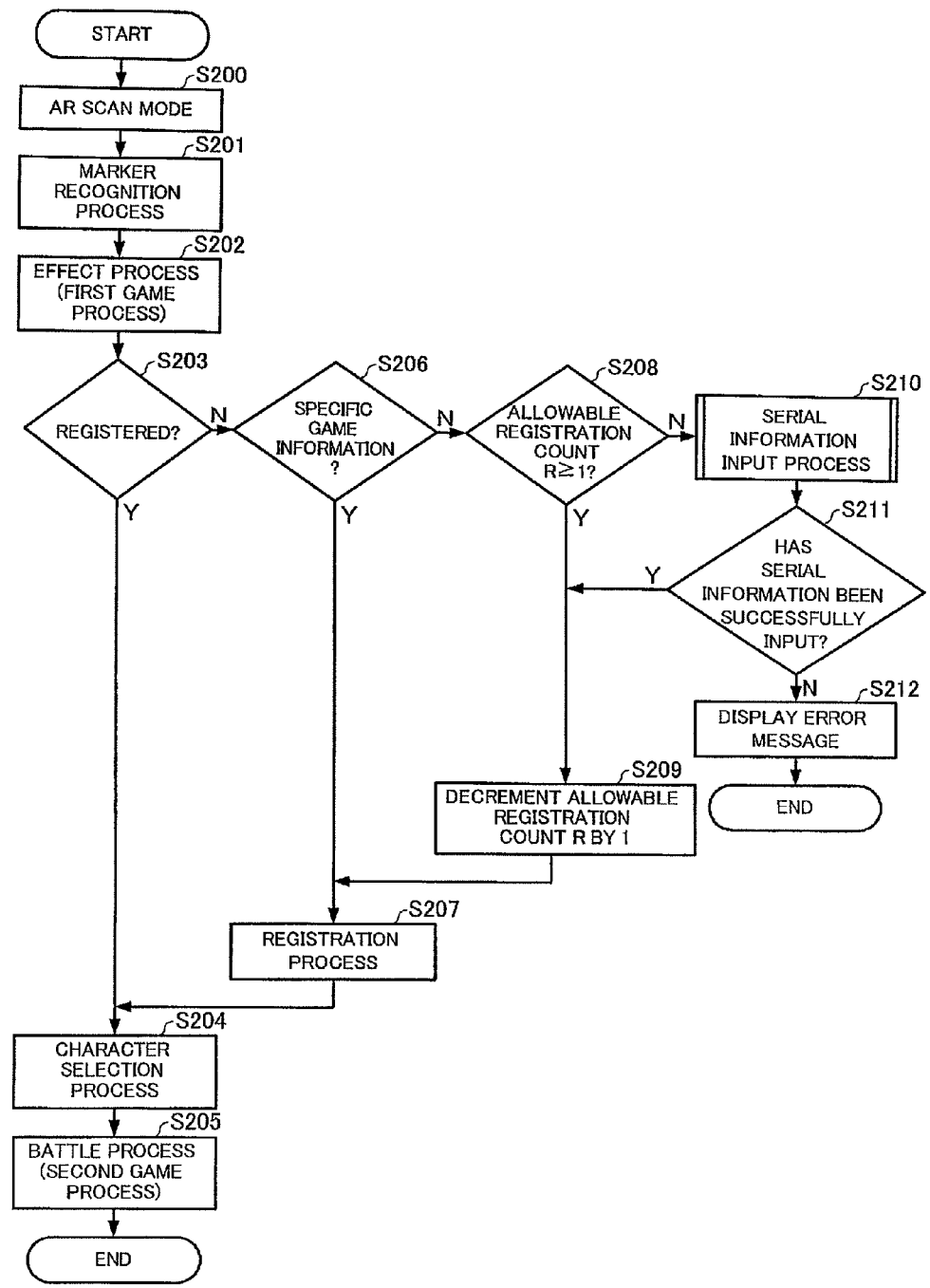
FIG. 17 is a flowchart illustrating a process performed by a terminal according to one embodiment of the invention.

The registration process is described below with reference to FIG. 17.

When an AR scan mode (i.e., a mode for recognizing the marker MK) has been selected based on the input information (step S200), the marker recognition process is performed (step S201). The effect process (first game process) is performed based on the game information acquired by the marker recognition process (step S202).

Next, whether or not the acquired game information has been registered is determined (step S203). When the acquired game information has been registered (Y in step S203), the character selection process is performed (step S204). The battle process (second game process) that causes the selected character to battle with the character indicated by the acquired game information is performed (step S205), and the process is terminated.

When the acquired game information has not been registered (N in step S203), whether or not the acquired game information is the specific game information recorded on a campaign card or the like is determined (step S206). When the acquired game information is the specific game information (Y in step S206), the specific game information registration process is performed (step S207), and the step S204 is performed.

Figure 18:
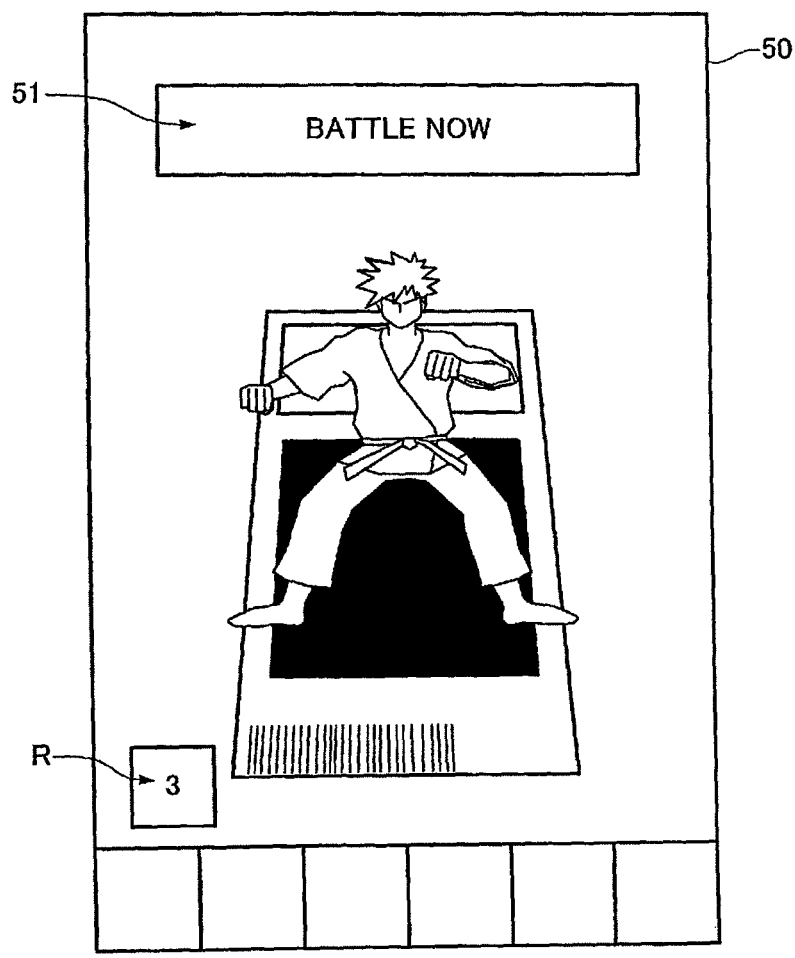
FIG. 18 illustrates an example of a display image according to one embodiment of the invention.

FIG. 18 illustrates an example of the display image 50 displayed after the step S203 or S206. For example, characters "BATTLE NOW" (see 51) are displayed, and the next step may be performed when an operation input (e.g., touch operation input) has been performed on the characters "BATTLE NOW". As illustrated in FIG. 18, the allowable registration count R may also be displayed so that the player can determine the number of pieces of game information that can be additionally registered.

When the acquired game information is not the specific game information (N in step S206), whether or not the allowable registration count R is equal to or larger than 1 (given number) (R≥1) is determined (step S208). When the allowable registration count R is equal to or larger than 1 (R≥1) (Y in step S208), the allowable registration count R is decremented by 1, and the step S207 is performed. In this case, the registration count Q is incremented by 1.

Figure 19:
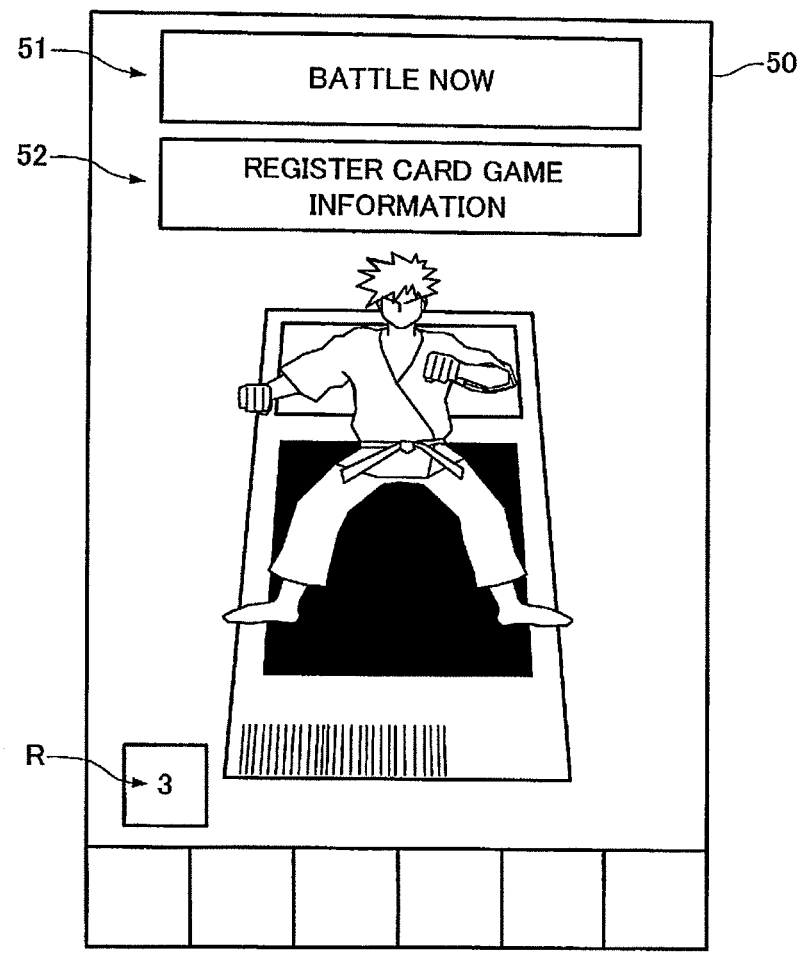
FIG. 19 illustrates an example of a display image according to one embodiment of the invention.

FIG. 19 illustrates an example of the display image 50 displayed when it has been determined that the allowable registration count R is equal to or larger than 1 in the step S208. For example, a game information registration message 52, and characters "BATTLE NOW" (see 51) are displayed. The step S209 may be performed when an operation input (e.g., touch operation input) has been performed on the characters "BATTLE NOW". As illustrated in FIG. 19, the allowable registration count R may also be displayed so that the player can determine the number of pieces of game information that can be additionally registered. When the allowable registration count R has been updated, the updated (decremented) allowable registration count R is displayed.

When the allowable registration count R is equal to or larger than 1 (R<1) (N in step S208), the serial information input process is performed (step S210). The serial information input process is implemented by the process illustrated in FIG. 11.

Whether or not the serial information has been successfully input is determined (step S211). When the serial information has been successfully input (when the registration limit count has been changed (incremented)) (Y in step S211), the step S209 is performed. When the serial information has not been successfully input (when the registration limit count has not been changed (incremented)) (N in step S211), an error message is displayed (step S212), and the process is terminated.

Figure 20:
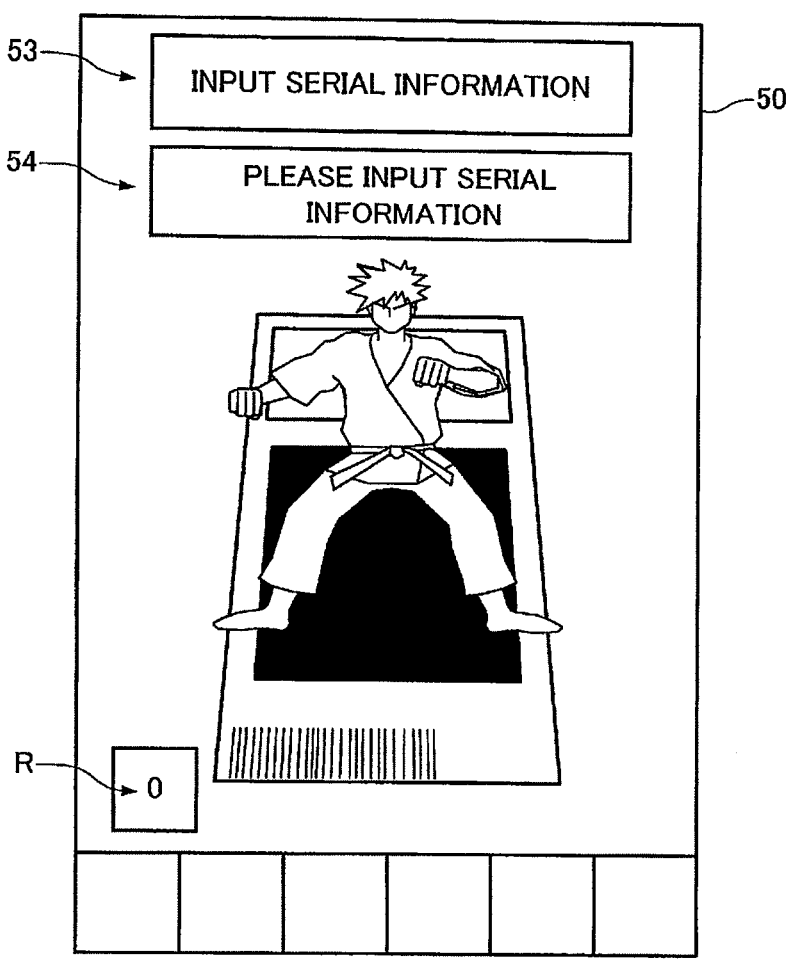
FIG. 20 illustrates an example of a display image according to one embodiment of the invention.

FIG. 20 illustrates an example of the display image 50 displayed when it has been determined that the allowable registration count R is not equal to or larger than 1 in the step S208. For example, a message 54 that prompts the player to input the serial information is displayed. The step S210 may be performed when an operation input (e.g., touch operation input) has been performed on characters "INPUT SERIAL INFORMATION" (see 53). Note that the allowable registration count R is also displayed as illustrated in FIG. 20. When the allowable registration count R has been updated (incremented), the updated (incremented) allowable registration count R is displayed. The process is thus completed.

4. Arcade Game Device

Figure 21A:
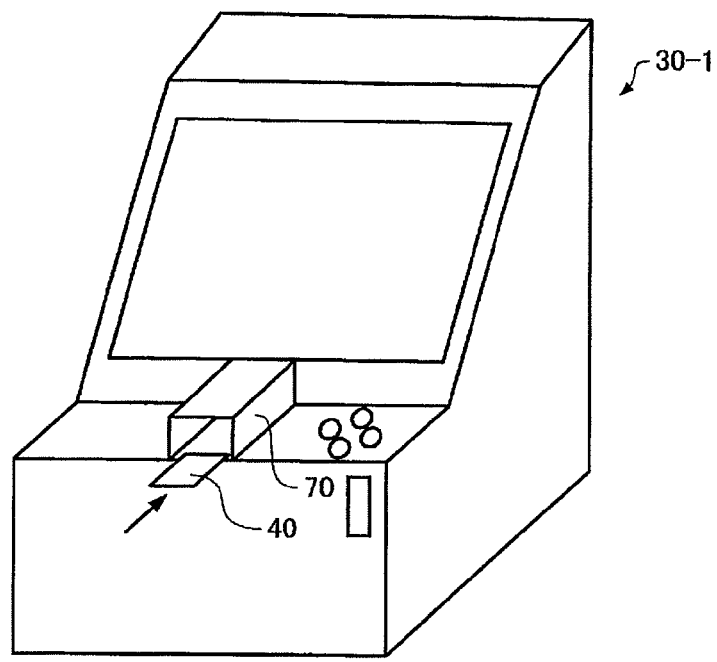
FIG. 21A is a view illustrating an arcade game device according to one embodiment of the invention.
Figure 21B:
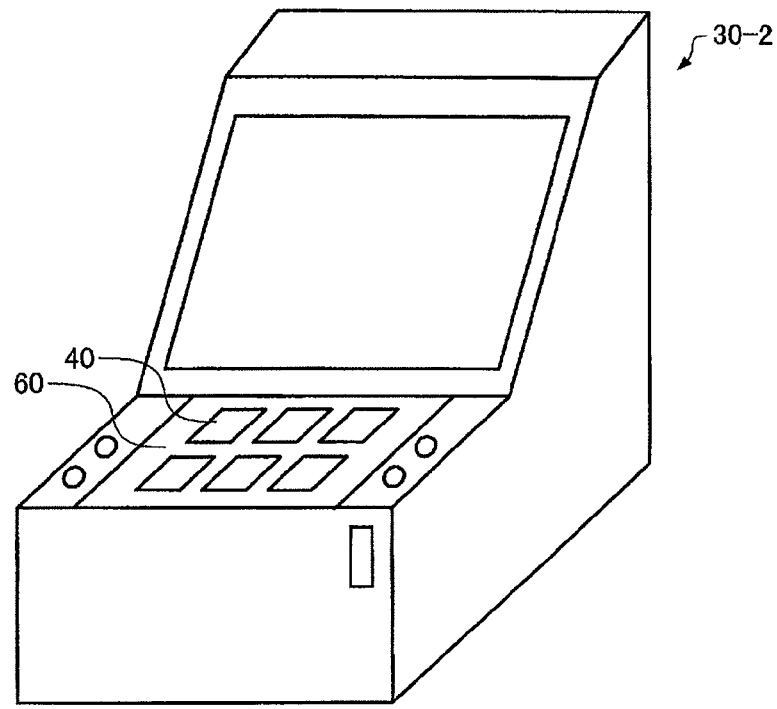
FIG. 21B is a view illustrating an arcade game device according to one embodiment of the invention.

FIGS. 21A and 21B illustrate an example of an arcade game device (housing). As illustrated in FIG. 21A, when the card 40 has been inserted into a card insertion section 70 of an arcade game device 30-1, the card is captured by an imaging section of the arcade game device 30-1, and the recognition process is performed on each captured image. The code GC is read based on the recognition results for each captured image, and the game process is performed.

FIG. 21B illustrates another example of the arcade game device. As illustrated in FIG. 21b, when the card 40 has been placed on a transparent colorlessness stage 60, the card 40 placed on the stage 60 is captured by an imaging section of an arcade game device 30-2, and the recognition process is performed on each captured image. For example, the back side of the card 40 is captured, and the code GC recorded on the card 40 is recognized. Note that the arcade game devices 30-1 and 30-2 may recognize the marker MK, and perform the same process as that of the processing section 100 of the terminal 10.

5. Application Example of Server

Although an example in which the terminal 10 manages the allowable registration count R has been described above, the server 20 may manage the game information allowable registration count R. Specifically, the server 20 may update the registration limit count P, the registration count Q, and the allowable registration count R.

5.1 Application Example 1

In Application Example 1, the server 20 does not receive the serial information from the terminal 10, and receives the update allowable registration count that indicates the same number as the number of pieces of game information.

For example, the server 20 stores the terminal identification information about each terminal 10 and the game information allowable registration count R of each terminal 10 in a linked manner. The server 20 receives the update allowable registration count that indicates the same number as the number of pieces of game information acquired through the terminal 10, and the terminal identification information of the terminal 10 from the terminal 10.

Specifically, the terminal 10 acquires the serial information from the serial code SC (or a given code), and transmits the update allowable registration count obtained from the serial information to the server 20. The server 20 updates the allowable registration count R that is stored while being linked to the terminal identification information corresponding to the received update allowable registration count.

When the server 20 has received a game information registration request from the terminal 10, the server 20 transmits a registration permission notification (e.g., flag "1") to the terminal 10 when the allowable registration count R corresponding to the terminal identification information of the terminal 10 is equal to or larger than a given number (e.g., 1), and transmits a registration non-permission notification (e.g., flag "0") to the terminal 10 when the allowable registration count R corresponding to the terminal identification information of the terminal 10 is less than a given number (e.g., 1). The server 20 decrements the allowable registration count R corresponding to the terminal identification information of the terminal 10 (e.g., decrements the allowable registration count R by 1) when the server 20 has transmitted the registration permission notification to the terminal 10. Note that the server 20 may increment the registration count Q by 1 when decrementing the allowable registration count R by 1.

5.2 Application Example 2

In Application Example 2, the server 20 receives the serial information from the terminal 10.

For example, the server 20 stores the terminal identification information about each terminal 10 and the game information allowable registration count R of each terminal 10 in a linked manner. The server 20 receives the serial information acquired together with the game information acquired through the terminal 10, and the terminal identification information of the terminal 10 from the terminal 10.

The server 20 determines whether or not the received serial information is valid. When the received serial information is valid, the server 20 updates the allowable registration count R corresponding to the terminal identification information based on the update allowable registration count corresponding to the serial information.

When the server 20 has received a game information registration request from the terminal 10, the server 20 transmits a registration permission notification to the terminal 10 when the allowable registration count R corresponding to the terminal identification information of the terminal 10 is equal to or larger than a given number (e.g., 1), and transmits a registration non-permission notification to the terminal 10 when the allowable registration count R corresponding to the terminal identification information of the terminal 10 is less than a given number (e.g., 1). The server 20 decrements the allowable registration count R corresponding to the terminal identification information of the terminal 10 by 1 when the server 20 has transmitted the registration permission notification to the terminal 10. Note that the server 20 may increment the registration count Q by 1 when decrementing the allowable registration count R by 1.

5.3 Other

In Application Examples 1 and 2, the server 20 may transmit the registration permission notification to the terminal 10 when the server 20 has received a specific game information registration request from the terminal 10 regardless of whether or not the allowable registration count R corresponding to the terminal identification information of the terminal 10 is equal to or larger than a given number (e.g., 1). In this case, the server 20 does not decrement the allowable registration count R corresponding to the terminal identification information of the terminal 10 (e.g., does not decrement the allowable registration count R by 1, or does not change the allowable registration count R) when the server 20 has transmitted the specific game information registration permission notification to the terminal 10.

In Application Examples 1 and 2, when the server 20 has received a game information registration request from the terminal 10, the server 20 does not decrement the allowable registration count corresponding to the terminal identification information of the terminal 10 (e.g., does not decrement the allowable registration count by 1, or does not change the allowable registration count) when the game information has been registered.

For example, the server 20 manages the presence or absence of registration of each game information on a terminal basis. When the server 20 has received a registration request for the game information A (character information about the character A) from the terminal having the terminal identification information "1", the server 20 determines whether or not the game information A corresponding to the terminal identification information "1" has been registered, and does not decrement the allowable registration count corresponding to the terminal identification information of the terminal 10 (e.g., does not decrement the allowable registration count R by 1, or does not change the allowable registration count) when it has been determined that the game information A has been registered. Note that the game information A may be overwritten, or may not be registered when the game information A has been registered.

The terminal 10 registers the game information when the terminal 10 has received the registration permission notification from the server 20 in response to the game information registration request. The terminal 10 does not register the game information when the terminal 10 has received the registration non-permission notification from the server 20 in response to the game information registration request.

Although an example of a network system in which the server 20 and the terminal 10 are connected via a network has been described above, the process performed by the processing section 100 of the terminal 10 and the process performed by the processing section 200 of the server 20 may be performed by the server 20.

The server 20 may be a server that provides a service that allows a plurality of players to communicate. For example, the server 20 may be a server that provides a social networking service (SNS) (i.e., community service).

The server 20 may provide an online game service in response to a request from the terminal 10. Specifically, the terminal 10 may transmit input information input by the player using the terminal 10 to the server 20, and the server 20 may perform a game calculation process based on the received input information. The server 20 may transmit the game calculation results to the terminal 10, and the terminal 10 may display the received game calculation results on the display section 190.

For example, the server 20 may consume the point value of the player from the terminal 10 (or charges the terminal 10) via a network, and transmit the game information and the serial information (valid serial information) to the terminal 10. For example, the server 20 may transmit three pieces of game information and valid serial information (in which the update allowable registration count is "3") to the terminal 10.

6. Application Example of Terminal

Although an example in which the terminal 10 transmits the serial information to the server 20, and receives the registration limit count P from the server 20 to update the allowable registration count R has been described above, the terminal 10 may acquire the update allowable registration count that indicates the same number as the number of pieces of acquired game information, and update the allowable registration count based on the update allowable registration count.

For example, the terminal 10 may update the allowable registration count R based on the value (update allowable registration count) corresponding to the serial information. Specifically, the terminal 10 may acquire the serial information from the serial code SC (or a given code). The terminal 10 may determine whether or not the serial information is valid. When the serial information is valid, the terminal 10 may add the update allowable registration count obtained from the serial information to the allowable registration count R.

7. Additional Application Example

Although an example of a network system in which the server 20 and the terminal 10 are connected via a network has been described above, the process performed by the processing section 100 of the terminal 10 and the process performed by the processing section 200 of the server 20 may be performed by a single game system.

The first game process and second game process may be various game processes such as a battle game process (e.g., fighting game process), a role-playing game process, a sport game process, an action game process, a music game process, a shooting game process, a racing game process, a quiz game process, a board game process, and an event process. It suffices that the first game process and the second game process be different game processes.

For example, when implementing a role-playing game, the game information (characters A, B, and C) acquired from the marker MK is added to the list (first game process). When only the character A has been registered as the game information for the second game process, only the registered character A is selected as a character of a group (party) including the player character (second game process).

For example, when implementing a baseball game, an exhibition game process is performed based on the game information (characters A, B, and C) acquired from the marker MK (first game process). When only the character A has been registered as the game information for the second game process, only the registered character A is selected for a league series game process (second game process).

When implementing a battle game process, a battle process that causes the player character to battle with a character A for which the strength parameter is set to "10" is performed based on the game information (characters A, B, and C) acquired from the marker MK (first game process). When only the character A has been registered as the game information for the second game process, a battle process that causes the player character to battle with a character A for which the strength parameter is set to "50" is performed (second game process). Specifically, even when the strength parameter of the character A differs, the second game process can provide the player with a game with a high difficulty level by changing the game process.

Although an example has been described above in which the operator sells a package including three cards 40 and the printed matter 60 to which the serial code SC is printed, it is also possible to sell a package including one card 40 and the printed matter 60 to which the serial code SC is printed, or a package including two or more cards 40 and the printed matter 60 to which the serial code SC is printed. The serial code SC may be printed on goods, and the card may be attached as a supplement. The serial code SC is the code of the serial information for requesting the update allowable registration count in a number larger than the number of cards.

The serial code SC may be recorded on one card 40.

When rare card game information (rare game information) has been registered, the allowable registration count may be decremented by 2. Specifically, when the game information acquired from a rare card has been registered, the allowable registration count may be decremented by a larger value as compared with the case where the game information acquired from a normal card has been registered. For example, the allowable registration count may be decremented by "1" when game information A acquired from a normal card has been registered, and may be decremented by "2" when game information E acquired from a rare card has been registered.

REFERENCE SIGNS LIST

10, 10A, 10B, 10C: terminal, 20: server, 30-1, 30-2: arcade game device, 100: processing section, 110: communication control section, 111: acquisition section, 112: game processing section, 113: registration section, 114: display control section, 115: update section, 116: reception section, 120: drawing section, 130: sound generation section, 160: input section, 162: detection section, 170: storage section, 172: main storage section, 180: information storage medium, 190: display section, 192: sound output section, 196: communication section, 200: processing section, 210: network setting section, 211: communication control section, 214: update section, 260: memory section, 270: storage section, 272: main storage section, 280: information storage medium, 296: communication section

The invention claimed is:

1. A server that is connected to a terminal via a network, and manages registration of game information, the terminal performing a first game process that utilizes stored game information, and a second game process that utilizes registered game information among the stored game information, the server comprising:
   a memory storing terminal identification information of the terminal and an allowable registration count of the game information for the terminal in a linked manner; and
   a processor operatively coupled to the memory, the processor being programmed to:
      receive data that specifies an update allowable registration count and the terminal identification information of the terminal, the update allowable registration count being linked to a number of pieces of game information acquired through the terminal;
      update the allowable registration count that is stored in the memory while being linked to the terminal identification information corresponding to the received data that specifies the update allowable registration count;
      transmit a registration permission notification to the terminal upon reception of a game information registration request from the terminal when the allowable registration count corresponding to the terminal identification information of the terminal is equal to or larger than a given number, and transmit a registration non-permission notification to the terminal upon reception of the game information registration request from the terminal when the allowable registration count corresponding to the terminal identification information of the terminal is less than the given number; and
      decrement the allowable registration count when the registration permission notification is transmitted to the terminal, wherein:
   the data that specifies the update allowable registration count is serial information acquired through the terminal, the serial information being linked to the terminal identification information of the terminal for use only by the terminal, and
   the updating the allowable registration count includes the processor being programmed to:
      (i) determine whether or not the received serial information is valid,
      (ii) update the allowable registration count corresponding to the terminal identification information based on the update allowable registration count corresponding to the serial information when the received serial information is valid,
      (iii) invalidate the received serial information after updating the allowable registration count based on the received valid serial information, and
      (iv) prevent use of the serial information upon subsequent reception of the update allowable registration count and the serial information.

2. The server as defined in claim 1, wherein the data that specifies the update allowable registration count is the update allowable registration count that indicates a same number as the number of pieces of game information acquired through the terminal.

3. The server as defined in claim 1, wherein the serial information is acquired together with the game information acquired through the terminal.

4. The server as defined in claim 1, wherein the processor is programmed to:
   transmit the registration permission notification to the terminal upon reception of a specific game information registration request from the terminal regardless of whether or not the allowable registration count corresponding to the terminal identification information of the terminal is equal to or larger than the given number, and
   not decrement the allowable registration count when the registration permission notification is transmitted to the terminal.

5. The server as defined in claim 1, wherein the processor is programmed to not decrement the allowable registration count corresponding to the terminal identification information of the terminal upon reception of the game information registration request from the terminal when the game information of the game information registration request has been registered.

6. A network system comprising the server as defined in claim 1, and the terminal as defined in claim 1, the server and the terminal exchanging data via a network.

7. A terminal that performs a game process and exchanges data for the server according to claim 1 via a network, the terminal comprising:
   a terminal memory storing an allowable registration count of game information; and
   a processor operatively coupled to the memory, the processor being programmed to:
      acquire the game information and serial information;
      perform a first game process based on the acquired game information;
      register the game information under a given condition upon reception of a game information registration request;
      perform a second game process based on the registered game information;
      update the allowable registration count based on the update allowable registration count corresponding to the serial information when the acquired serial information is valid;
      register the game information when the allowable registration count is equal to or larger than a given number, and not registering the game information when the allowable registration count is less than the given number; and
      decrement the allowable registration count when the game information has been registered.

8. A network system comprising a server and a terminal, the server and the terminal exchanging data via a network, the terminal including:
   a terminal memory storing an allowable registration count of game information; and
   a terminal processor operatively coupled to the memory, the terminal processor programmed to:
      acquire the game information and serial information;
      perform a first game process based on the acquired game information;
      register the game information under a given condition upon reception of a game information registration request;
      perform a second game process based on the registered game information;
      transmit terminal identification information of the terminal and the serial information to the server; and
      update the allowable registration count of the game information,
   the server including:
      a server memory storing a registration limit count of the game information so that the registration limit count is linked to the terminal identification information of the terminal, the serial information being linked to the terminal identification information of the terminal for use only by the terminal; and
      a server processor operatively coupled to the memory, the server processor programmed to:
         receive the terminal identification information of the terminal and the serial information from the terminal;
         determine whether or not the received serial information is valid;
         update the registration limit count corresponding to the terminal identification information based on an update allowable registration count corresponding to the serial information when the received serial information is valid;
         invalidate the received serial information after updating the allowable registration count based on the received valid serial information;
         prevent use of the serial information upon subsequent reception of the update allowable registration count and the serial information; and
         transmit the registration limit count corresponding to the terminal identification information of the terminal to the terminal in response to a request from the terminal, wherein:
      the terminal processor is programmed to receive the registration limit count from the server,
      the terminal processor is programmed to update the allowable registration count based on the registration limit count upon reception of the registration limit count from the server,
      the terminal processor is programmed to register the game information when the allowable registration count is equal to or larger than a given number, and not registering the game information when the allowable registration count is less than the given number, and
      the terminal processor is programmed to decrement the allowable registration count when the game information has been registered in the terminal.

9. A non-transitory computer-readable information storage medium storing a program that causes a server that is connected to a terminal via a network to manage registration of game information, the terminal performing a first game process that utilizes stored game information, and a second game process that utilizes registered game information among the stored game information, the program causing a computer to function as:
   a memory storing terminal identification information of the terminal and an allowable registration count of the game information for the terminal in a linked manner; and
   a processor operatively coupled to the memory, the processor being programmed to:
      receive data that specifies an update allowable registration count and the terminal identification information of the terminal, the update allowable registration count being linked to a number of pieces of game information acquired through the terminal;
      update the allowable registration count that is stored while being linked to the terminal identification information corresponding to the received data that specifies the update allowable registration count;
      transmit a registration permission notification to the terminal upon reception of a game information registration request from the terminal when the allowable registration count corresponding to the terminal identification information of the terminal is equal to or larger than a given number, and transmit a registration non-permission notification to the terminal upon reception of the game information registration request from the terminal when the allowable registration count corresponding to the terminal identification information of the terminal is less than the given number;
      decrement the allowable registration count when the communication control section has transmitted the registration permission notification to the terminal, wherein:
   the data that specifies the update allowable registration count is serial information acquired through the terminal, the serial information being linked to the terminal identification information of the terminal for use only by the terminal, and the updating the allowable registration count includes the processor being programmed to:
(i) determine whether or not the received serial information is valid,
(ii) update the allowable registration count corresponding to the terminal identification information based on the update allowable registration count corresponding to the serial information when the received serial information is valid,
(iii) invalidate the received serial information after updating the allowable registration count based on the received valid serial information, and
(iv) prevent use of the serial information upon subsequent reception of the update allowable registration count and the serial information.

10. The non-transitory computer-readable information storage medium as defined in claim 9, wherein the data that specifies the update allowable registration count is the update allowable registration count that indicates a same number as the number of pieces of game information acquired through the terminal.

11. The non-transitory computer-readable information storage medium as defined in claim 9, wherein the serial information is acquired together with the game information acquired through the terminal.

12. The non-transitory computer-readable information storage medium as defined in claim 9, wherein the processor is programmed to:

transmit the registration permission notification to the terminal upon reception of a specific game information registration request from the terminal regardless of whether or not the allowable registration count corresponding to the terminal identification information of the terminal is equal to or larger than the given number, and not decrement the allowable registration count when the registration permission notification is transmitted to the terminal.

13. The non-transitory computer-readable information storage medium as defined in claim 9, wherein the processor is programmed to not decrement the allowable registration count corresponding to the terminal identification information of the terminal upon reception of the game information registration request from the terminal when the game information of the game information registration request has been registered.

* * * * *

UNITED STATES PATENT AND TRADEMARK OFFICE
CERTIFICATE OF CORRECTION

PATENT NO. : 9,744,443 B2
APPLICATION NO. : 14/110608
DATED : August 29, 2017
INVENTOR(S) : Koji Tezuka et al.

It is certified that error appears in the above-identified patent and that said Letters Patent is hereby corrected as shown below:

On the Title Page

Item (30): Foreign Application Priority Data:
Change "Apr. 11, 2012" to --April 12, 2011--.

Signed and Sealed this
Twelfth Day of December, 2017

Joseph Matal
*Performing the Functions and Duties of the
Under Secretary of Commerce for Intellectual Property and
Director of the United States Patent and Trademark Office*